United States Patent
Holly et al.

(10) Patent No.: US 11,243,753 B2
(45) Date of Patent: Feb. 8, 2022

(54) MOBILE APP PUBLISHING FOR A RESPONSIVE COMMUNITY EXPERIENCE

(71) Applicant: salesforce.com, inc., San Francisco, CA (US)

(72) Inventors: Steven Holly, Laguna Niguel, CA (US); Eugene Oksman, San Francisco, CA (US); Amit Lubovsky, Sunnyvale, CA (US); Jenton Lee, Albany, CA (US)

(73) Assignee: salesforce.com, inc., San Francisco, CA (US)

( * ) Notice: Subject to any disclaimer, the term of this patent is extended or adjusted under 35 U.S.C. 154(b) by 8 days.

(21) Appl. No.: 16/177,813

(22) Filed: Nov. 1, 2018

(65) Prior Publication Data

US 2020/0097264 A1 Mar. 26, 2020

Related U.S. Application Data

(60) Provisional application No. 62/735,611, filed on Sep. 24, 2018.

(51) Int. Cl.
*G06F 8/60* (2018.01)
*G06F 8/65* (2018.01)

(52) U.S. Cl.
CPC . *G06F 8/60* (2013.01); *G06F 8/65* (2013.01)

(58) Field of Classification Search
CPC .......... G06F 8/33; G06F 8/36; G06F 8/60–66; G06F 3/1225; G06F 3/123;

(Continued)

(56) References Cited

U.S. PATENT DOCUMENTS 9,729,542 B2 * 8/2017 Jayanti Venkata ........................... H04L 41/5096
9,792,585 B2 * 10/2017 Pereira ................... G06Q 10/10

(Continued)

OTHER PUBLICATIONS

Anonymous, "Submit Your App via Como to the Apple App Store", Como [online], 2015 [retrieved Dec. 11, 2020], Retrieved from Internet: <URL: https://web.archive.org/web/20160818015418/https://help.como.com/hc/en-us/articles/201581592-Submit-Your-App-via-Como-to-the-Apple-App-Store>, whole document.*

(Continued)

*Primary Examiner* — Todd Aguilera
(74) *Attorney, Agent, or Firm* — Sterne, Kessler, Goldstein and Fox, P.L.L.C.

(57) ABSTRACT

Embodiments of apparatus, systems, and methods are described for creating and configuring a custom mobile application (app), with communities, using a graphical user interface (GUI). The GUI enables selection of a pre-configured template for creating a custom mobile app for a user group of a customer relationship management system or of an existing community. The GUI enables entry of metadata comprising identification of a specific user community of the custom mobile app. The GUI enables selection of a distribution model for the custom mobile app for the specific user community, further allowing entry of additional metadata comprising distribution model parameters and packaging parameters of the app. The GUI enables packaging of the app using the packaging parameters and publishing of the app to an app store using the distribution model parameters. The app becomes accessible from the app store for installation on a mobile device according to the distribution model.

21 Claims, 29 Drawing Sheets

(58) Field of Classification Search
CPC .... G06F 21/10–12; H04L 41/08–0896; G06Q 30/016
See application file for complete search history.

(56) References Cited

U.S. PATENT DOCUMENTS

| | | | |
|---|---|---|---|
| 2011/0066477 A1* | 3/2011 | Fujioka | G06F 8/36 705/14.4 |
| 2013/0346268 A1* | 12/2013 | Pereira | G06Q 10/10 705/34 |
| 2014/0026113 A1 | 1/2014 | Farooqi | |
| 2014/0223412 A1 | 8/2014 | Stracquatanio, III | |
| 2015/0169293 A1 | 6/2015 | Bozek et al. | |
| 2015/0319252 A1* | 11/2015 | Momchilov | H04L 67/141 709/223 |
| 2016/0085533 A1* | 3/2016 | Jayanti Venkata | G06F 21/45 717/175 |
| 2016/0154629 A1 | 6/2016 | Noens et al. | |
| 2016/0170712 A1* | 6/2016 | Luan | G06F 8/71 717/121 |
| 2017/0109142 A1 | 4/2017 | Kaushal | |

OTHER PUBLICATIONS

Anonymous, "Submit Your App via Como to the Google Play Store", Como [online], 2015 [retrieved Dec. 11, 2020], Retrieved from Internet: <URL:https://web.archive.org/web/20160818004350/https://help.como.com/hc/en-us/articles/201709601-Submit-Your-App-via-Como-to-the-Google-Play-Store>, whole document.*
European Search Report for European Application No. 19199236.1, dated Feb. 13, 2020, 9 pages.

* cited by examiner

|  | Managed Private | Managed Public | Delegated Private | Delegated Public |
|---|---|---|---|---|
| Android 1002 | - Managed Google Play ID (privateDistID)<br>- accountName | None | - accountID<br>- Service Account JWT Token<br>- pushServerKey<br>- pushSenderID<br>- privateDistID<br>- accountName | - accountID<br>- Service Account JWT Token<br>- pushServerKey<br>- pushSenderID |
| iOS 1004 | - VPP ID (privateDistID)<br>- accountName | N/A | N/A | - teamName ID (accountID)<br>- teamName Name |

| Android | | Delegated Private | Delegated Public | Managed Private | Managed Public |
|---|---|---|---|---|---|
| | | | To | | |
| From | Delegated Private | - | No account change; Admin migrates users | Users keep app; Change Account Ownership | Users keep app; Change Account Ownership |
| | Delegated Public | No account change; Admin migrates users | - | Users keep app; Change Account Ownership | Users keep app; Change Account Ownership |
| | Managed Private | Users keep app; Change Account Ownership | Users keep app; Change Account Ownership | - | No Account Change, users need to migrate |
| | Managed Public | Users keep app; Change Account Ownership | Users keep app; Change Account Ownership | No Account Change Users need to migrate | - |

FIG. 17

| 1800 | To | |
|---|---|---|
| iOS | Delegated Public | Managed Private |
| From Delegated Public | – | New App |
| Managed Private | New App | – |

FIG. 18

MOBILE APP PUBLISHING FOR A RESPONSIVE COMMUNITY EXPERIENCE

CROSS-REFERENCE TO RELATED APPLICATIONS

This application claims the benefit of U.S. Provisional Patent Application No. 62/735,611, filed Sep. 24, 2018, and entitled "Mobile App Publishing for a Responsive Community Experience," the entirety of which is hereby incorporated by reference.

This application is related to U.S. Provisional Patent Application No. 62/735,496, filed Sep. 24, 2018, and entitled "Desktop and Mobile Graphical User Interface Unification," the entirety of which is hereby incorporated by reference.

This application is also related to U.S. patent application Ser. No. 15/726,332, filed Oct. 5, 2017, and entitled "Systems, Methods, and Apparatuses for Creating and Reusing Communities within a Cloud Based Computing Environment," the entirety of which is hereby incorporated by reference.

BACKGROUND

Communities are branded spaces for a company's employees, customers, and partners to connect. Communities are a great vehicle by which a company can share information and collaborate with its employees, customers, and external or ancillary organizations, such as vendors, partnering businesses, or subsidiaries. A company can customize and create communities to meet its business needs, and then transition seamlessly between them. A company can create multiple communities for many different purposes. For example, a company could create a customer support community to reduce support costs by sharing tips and solutions, a channel sales community for partner deal support, a community dedicated to an upcoming event for use by the event's attendees, or a community representing a sub-group of an organization, such as an employee social group or a volunteer club within the organization.

Communities, or community spaces, which are typically provided online in web-based applications, can allow a company to share a subset of features and data from an internal customer relationship management (CRM) system that are applicable to the purpose of the community, in an engaging, branded experience. A community builder within a web app publisher, as described in U.S. patent application Ser. No. 15/726,332 ("Systems, Methods, and Apparatuses for Creating and Reusing Communities Within a Cloud Based Computing Environment"), for example, can be used to design, build, and brand communities using standard or customized app components with point-and-click customization. U.S. patent application Ser. No. 15/726,332 describes creating and reusing communities within a cloud-based environment, such as a database system implementation for the web, utilizing multi-tenant database technologies, client-server technologies, and traditional database technologies, such as on-demand database services. Although prevalent in web applications, such communities have not previously been made available to customers, partners, or vendors via a dedicated, or native, mobile application for use on mobile devices.

BRIEF DESCRIPTION OF THE DRAWINGS

The accompanying drawings, which are incorporated herein and form part of the specification, illustrate the present embodiments and, together with the description, further serve to explain the principles of the present embodiments and to enable a person skilled in the relevant art(s) to make and use the present embodiments.

FIG. 10 illustrates a table comprising examples of the combinations of metadata that the CRM system client can enter in an App Distribution GUI, according to some embodiments.

FIG. 16 illustrates an App Store Configuration GUI for specifying the custom mobile app packaging and configuration details, according to some embodiments.

FIG. 17 illustrates a table showing the different administrative requirements for changing distribution models in an out-of-band update of a custom mobile app in one example mobile operating system environment, according to some embodiments.

FIG. 18 illustrates a table showing the different administrative requirements for changing distribution models in an out-of-band update of a custom mobile app in a second mobile operating system environment, according to some embodiments.

Figure 1:
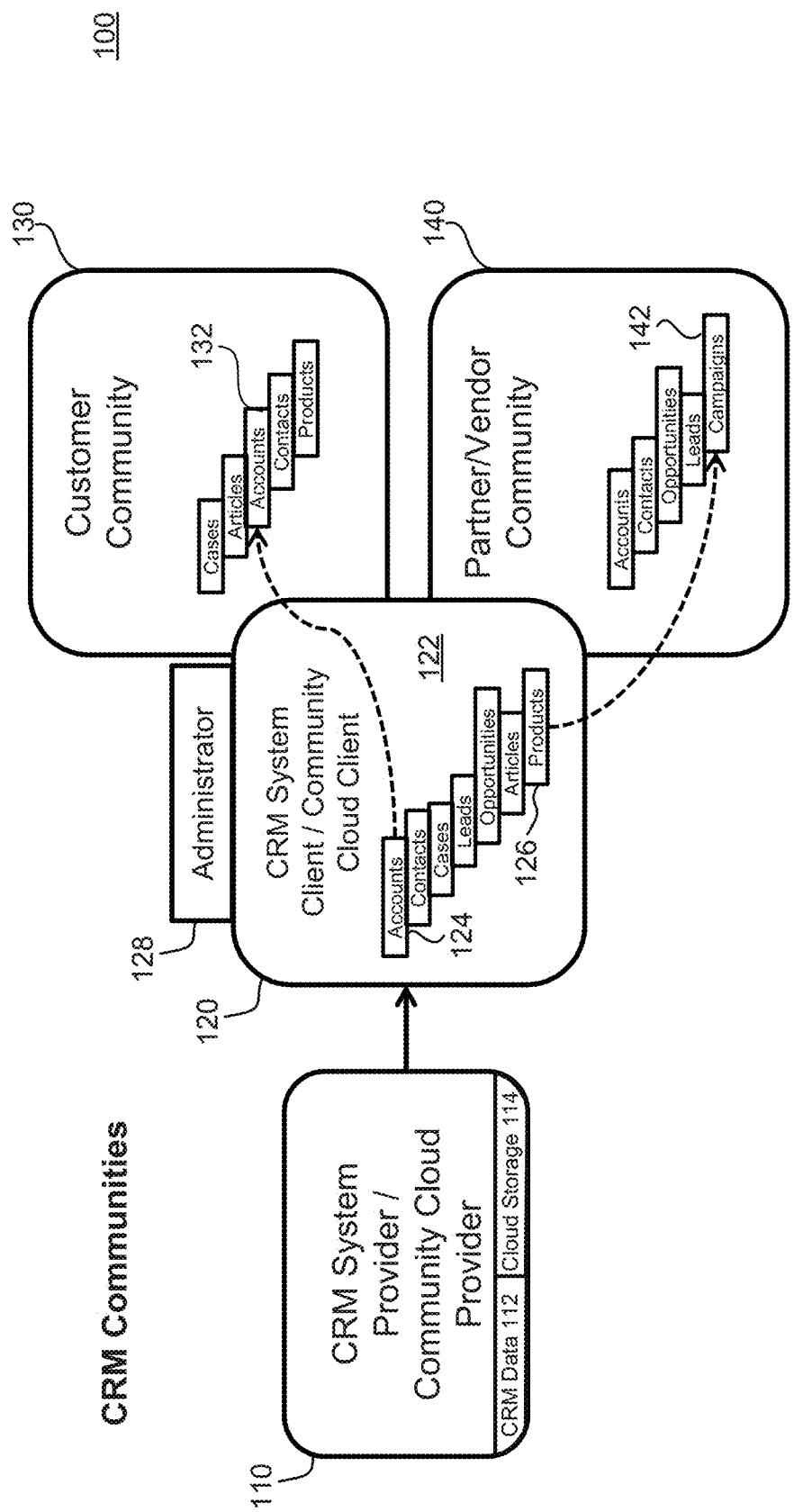
FIG. 1 illustrates a diagram showing examples of custom communities built upon a subset of features and data from a customer relationship management (CRM) system, according to some embodiments.

The features and advantages of the present embodiments will become more apparent from the Detailed Description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

This disclosure describes methods and user interfaces to provide access to custom communities within a dedicated, or native, mobile application (app) via easy publishing of the mobile app. Having all the features of a community found in a web application, plus more, the native mobile application can create a more responsive community experience than can be achieved by a web application alone.

FIG. 1 illustrates a diagram 100 showing how communities can be based on data and functionality of a CRM system and provided via a cloud-based computing environment, using web and/or mobile applications. CRM data for both web and mobile applications is provided from CRM databases utilizing multi-tenant database technologies, client-server technologies, and traditional database technologies described in U.S. patent application Ser. No. 15/726,332.

Diagram 100 illustrates a CRM system provider 110 providing CRM data 112, including access to community cloud storage 114, to CRM system client 120. From the CRM system client 120, a customer community 130 is provided access, by Administrator 128, to CRM data 122 regarding accounts 124, 132, for example. Also from the CRM system client 120, a partner/vendor community 140 is provided access, by Administrator 128, to CRM data 122 regarding products 126 for use in partner campaigns 142, for example. Communities can be customized by Administrator 128 to use the specific branding of the CRM system client 120 to increase brand recognition and user trust within the customer community 130 and partner/vendor community 140.

Features available from mobile applications, such as persistent (or push) notifications, that are not available via web applications, can now be available to a community from within a mobile app. Additionally, mobile apps with communities can be built quickly and automatically using a user-friendly graphical user interface (GUI) without an administrator having to write software code for the apps. The mobile app publisher of the CRM system can provide an abstraction layer that can allow CRM system clients to produce and distribute multiple instances of a custom mobile app, for different operating system platforms, through one unified interface, to one or more electronic application storefronts (hereinafter, "app stores"). By way of non-limiting example, a custom mobile app can be created in both iOS and ANDROID app instances, which can be published to the APPLE APP STORE and GOOGLE PLAY app store, respectively, using the same GUI. In this way, communities can be easily provided, discoverable, and accessible via various public and private app stores for better on-demand service to customers. The CRM system client, controller of the community, can also control the mobile apps to better meet and be more responsive to its customers' needs.

For example, an organization, such as a company, can create customized and branded business-to-business (B2B) or business-to-consumer (B2C) mobile apps using a mobile app publisher under a user interface (UI) framework that allows accelerated app creation in a visual development environment, using no code, with the help of standard and custom components. Thus, these mobile apps can be built in very few steps. The general features available from a mobile application under the UI framework are disclosed in con-currently-field U.S. Provisional Patent Application No. 62/735,496, entitled "Desktop and Mobile Graphical User Interface Unification." The company can then distribute the mobile apps to partners and customers via one or more commercial mobile app stores, such as APPLE, Inc.'s App Store for iOS apps and/or GOOGLE PLAY for ANDROID apps, by way of non-limiting example. The mobile apps can be made available either publicly or privately from each app store.

Within the features of a mobile app can now be a community dedicated to responding to a specific subset of users or a specific user need. The community can be designed and customized using a Community Builder under the same UI framework under which a mobile app is published, but using separate customization capabilities. The Community Builder allows a company to quickly create and style a custom community to match the company's branding. For more details on the Community Builder, see U.S. patent application Ser. No. 15/726,332, entitled "Systems, Methods, and Apparatuses for Creating and Reusing Communities within a Cloud Based Computing Environment."

A built community can now be integrated into a mobile app, enjoying the additional capabilities of a mobile app environment, such as persistent notifications, and the additional capabilities of the mobile app publisher, such as additional branding and customization features. The mobile app can access the data of a previously configured and stored community, for example, via access to a "Community Cloud," or cloud-based storage. See U.S. patent application Ser. No. 15/726,332 for details on the configuration and storage of communities in a Community Cloud.

Figure 2:
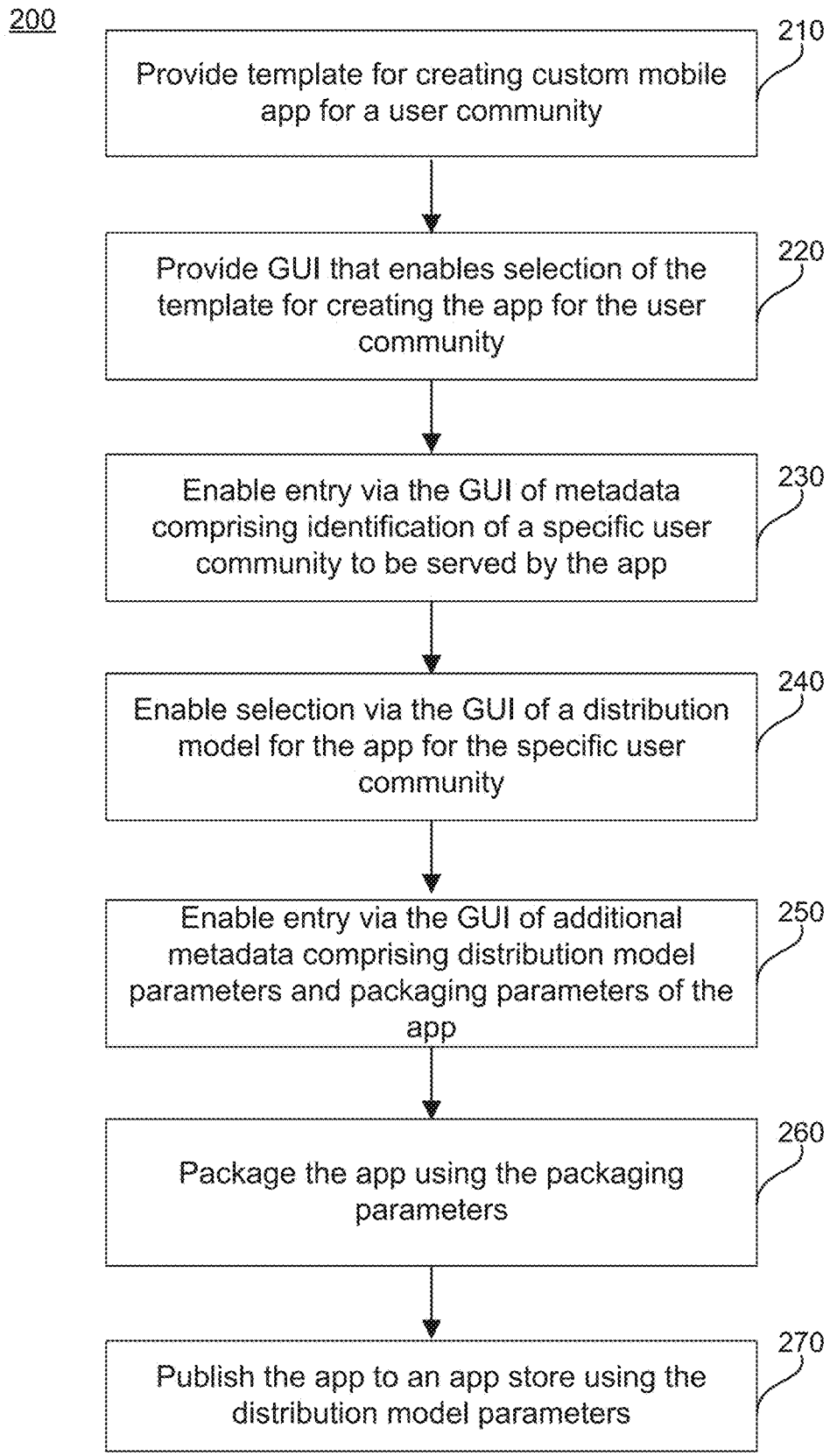
FIG. 2 illustrates a flowchart of a method for mobile app publishing that creates a responsive community experience, according to some embodiments.

A method for mobile app publishing that can create a responsive community experience is summarized in FIG. 2, which illustrates a flowchart 200 describing steps of the method, according to some embodiments, that need not be completed in the particular order shown.

Method steps 210 and 220 comprise setting up the mobile app with a template. A template in a mobile app embodiment may be thought of as master mobile app code used to produce other mobile apps. Use of templates reduce the time and cost associated with creating mobile application instances of CRM system functionality and communities. A template can include a pre-configured format for a custom mobile app for the CRM system in general, for a component of the CRM system, or for an existing community. In step 210, a computing device provides a template for creating a custom mobile app for a user group. In step 220, the computing device provides a GUI that enables selection of the template for creating the custom mobile app for the user group.

Method steps 230 through 270 represent a summary of a custom mobile app submission flow. There are two phases within the custom mobile app submission flow: (1) metadata collection, performed when the administrator fills out distribution model data forms to describe the custom app to build and then starts the build process, and (2) post-submission lifecycle steps that allow the newly created custom app to be packaged, installed, tested in a beta version, and submitted to an app store for review before publishing in the app store.

Method steps 230, 240, and 250 represent a summary of the first phase of the custom mobile app submission flow. In step 230, the computing device enables entry, via the GUI, of metadata comprising identification of a specific user community to be served by the custom mobile app. In step 240, the computing device enables selection, via the GUI, of a distribution model for the custom mobile app for the specific user community. In step 250, the computing device enables entry, via the GUI, of additional metadata comprising distribution model parameters and packaging parameters of the custom mobile app. The distribution model parameters include an app store ID, an app store account name, push notification server parameters, and a service account token, for example. The packaging parameters include a custom app name, a custom logo, a unique app icon, an app description, the language for the app text, and selectable colors, for example.

Steps 260 and 270 represent a summary of the second phase of the custom mobile app submission flow. In step 260, the computing device packages the custom mobile app using the packaging parameters. In step 270, the computing device publishes the app to an app store using the distribution model parameters.

The creating of the custom mobile app is performed automatically by a computing device as a result of GUI operations and entry of the metadata and the additional metadata by the administrator. Some embodiments of the GUI, implemented by a computer-readable device within a computer system, are described below and provide more details of the method.

Figure 3:
FIG. 3 illustrates a mobile app on a mobile device showing an example of a branded welcome, or home, screen for a CRM system client using a subset of the client's CRM data, according to an example embodiment.

FIG. 3 illustrates a branded mobile app on a mobile device 300 showing an example of a branded welcome, or home, screen for ABC Co. using data from ABC Co.'s CRM system, according to an example embodiment. In FIG. 3, the mobile app screen identifies the client name 302, branded graphics 304, icons on an application launch pad 306 for accessing specific types of CRM system data, and messaging 308 to the mobile app's user group, according to the client's needs for the user group. Aspects of the branded mobile app, including the look and feel of the interface, the specific features available on the interface, the choice of community to reference and serve, the menus and user actions available on the interface, the data presented, the grouping of the data, the user access to the data, customized use of the data, user notifications, other metadata to drive the app, the app's distribution model, and the app store account configuration, for example, can be controlled by ABC Co.'s app administrator(s).

A community mobile app for ABC Co., based on the example in FIG. 3, can specifically serve ABC Co.'s sales department, with sales-specific information and built-in collaboration features. In other embodiments, a unique subset of data and features within the mobile app can be provided to another community of users of an ABC Co. product for troubleshooting help, for example. The community may include customized features, such as a chat function to allow users within the community to tag and discuss attributes of the product and help each other learn and use the product, for example.

Figure 4:
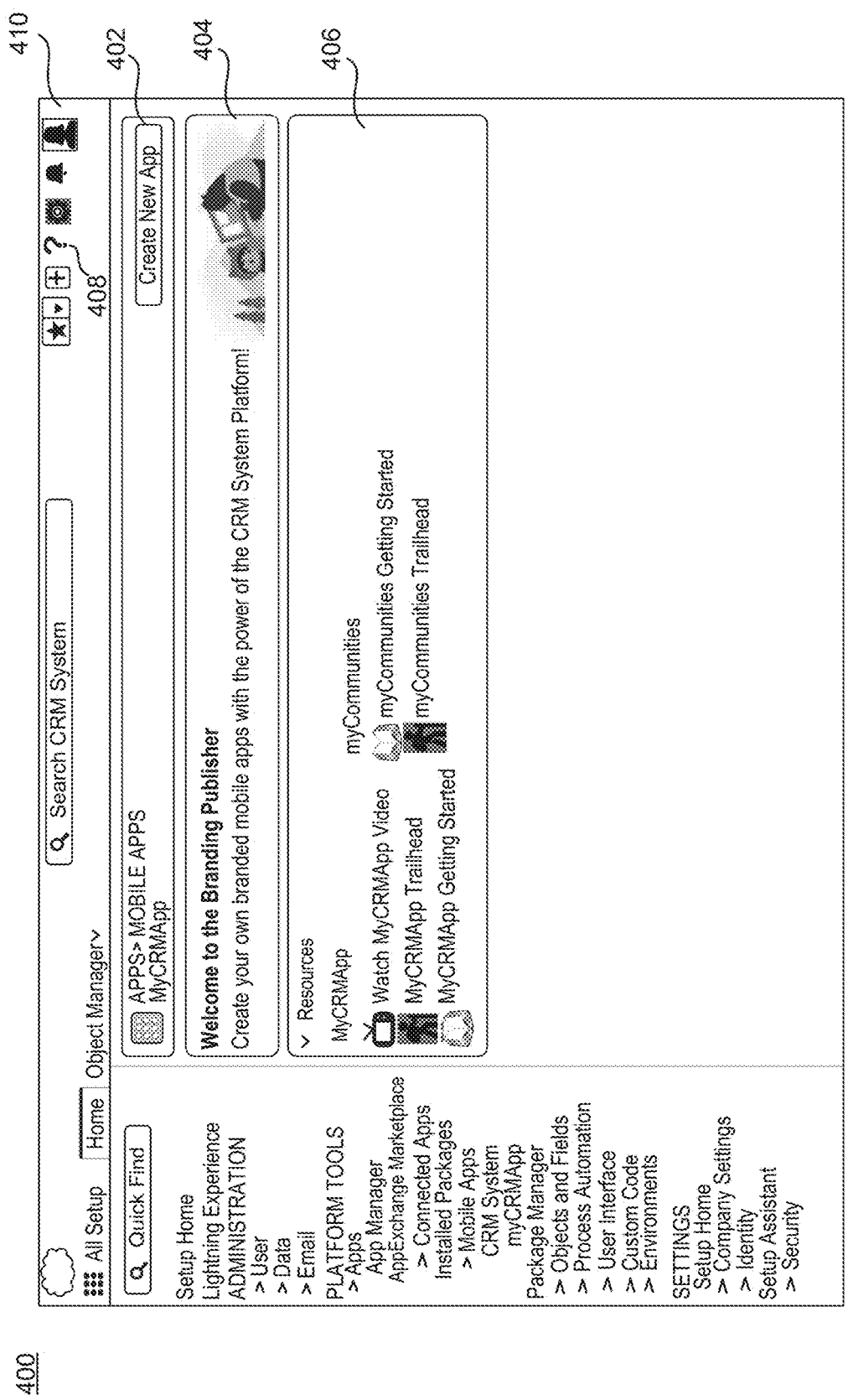
FIG. 4 illustrates a screenshot of a GUI landing page for creating a branded mobile app, including an option to incorporate a community into a mobile app, according to some embodiments.

FIG. 4 illustrates a screenshot of a GUI Landing Page 400 for creating a branded mobile app, including an option to incorporate a community into a mobile app, according to some embodiments. To start the process, an administrator can click the GUI button "Create New App" 402. Clicking on "Create New App" 402 opens a GUI selection box 500 (see FIG. 5). The GUI Landing Page 400 additionally includes a welcome banner 404 and a Resource card 406 with a listing of resource links. The resource links provide more information to the administrator about creating apps, such as links to videos that demonstrate the capabilities of the mobile app builder, and other informational resources to instruct the administrator how to use the GUI functionality, to define terms, and/or to provide the benefits and/or considerations of certain selections, for example.

Figure 5:
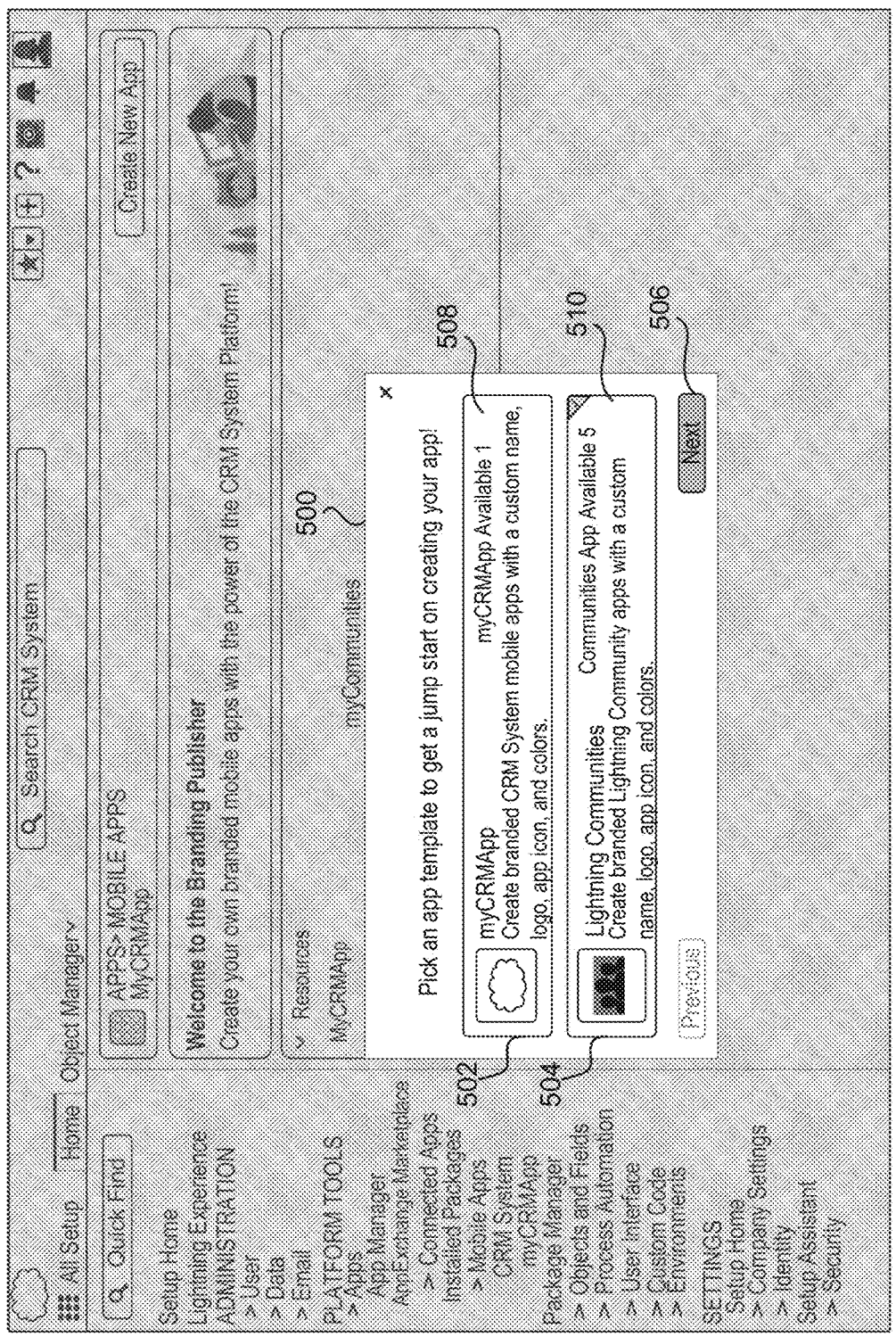
FIG. 5 illustrates a screenshot of a GUI selection box, according to some embodiments.

FIG. 5 illustrates a screenshot of the GUI selection box 500 for selecting a mobile app template, according to some embodiments. The GUI selection box 500 provides the administrator the option to select an app template, using a drop-down box, to create a branded CRM system mobile app 502 having a custom name, logo, app icon, and colors, or a branded community mobile app 504 having a custom name, logo, app icon, and colors. According to some embodiments, and as shown in FIG. 5, the communities template can be a "Lightning Communities" template, for example. A Lightning Community can be built upon a component user interface (UI) framework that provides core components that can be assembled and customized to build dynamic communities with simple drag-and-drop user actions, without the need for programming. Once a template option is selected, a "Next" button 506 will become active, allowing the administrator to click it to go to the next step of app creation.

In some embodiments, the GUI selection box 500 can include the number of branded CRM mobile apps available 508 to be created and the number of branded community mobile apps available 510 to be created, information that may depend on the number and types of licenses that a company has purchased for its CRM system, for example. In FIG. 5, for example, the GUI selection box 500 indicates that the administrator has license to create one (1) branded CRM mobile app (for example, "Salesforce App Available 1") and five (5) branded community mobile apps (for example, "Communities App Available 5"). If an administrator has already created the one (1) branded CRM mobile app allowed by license, the number of branded CRM mobile apps available 508 would be displayed as "0." If all licenses are used up, both the number of branded CRM mobile apps available 508 and the number of branded community apps available 510 could be "0."

Figure 6:
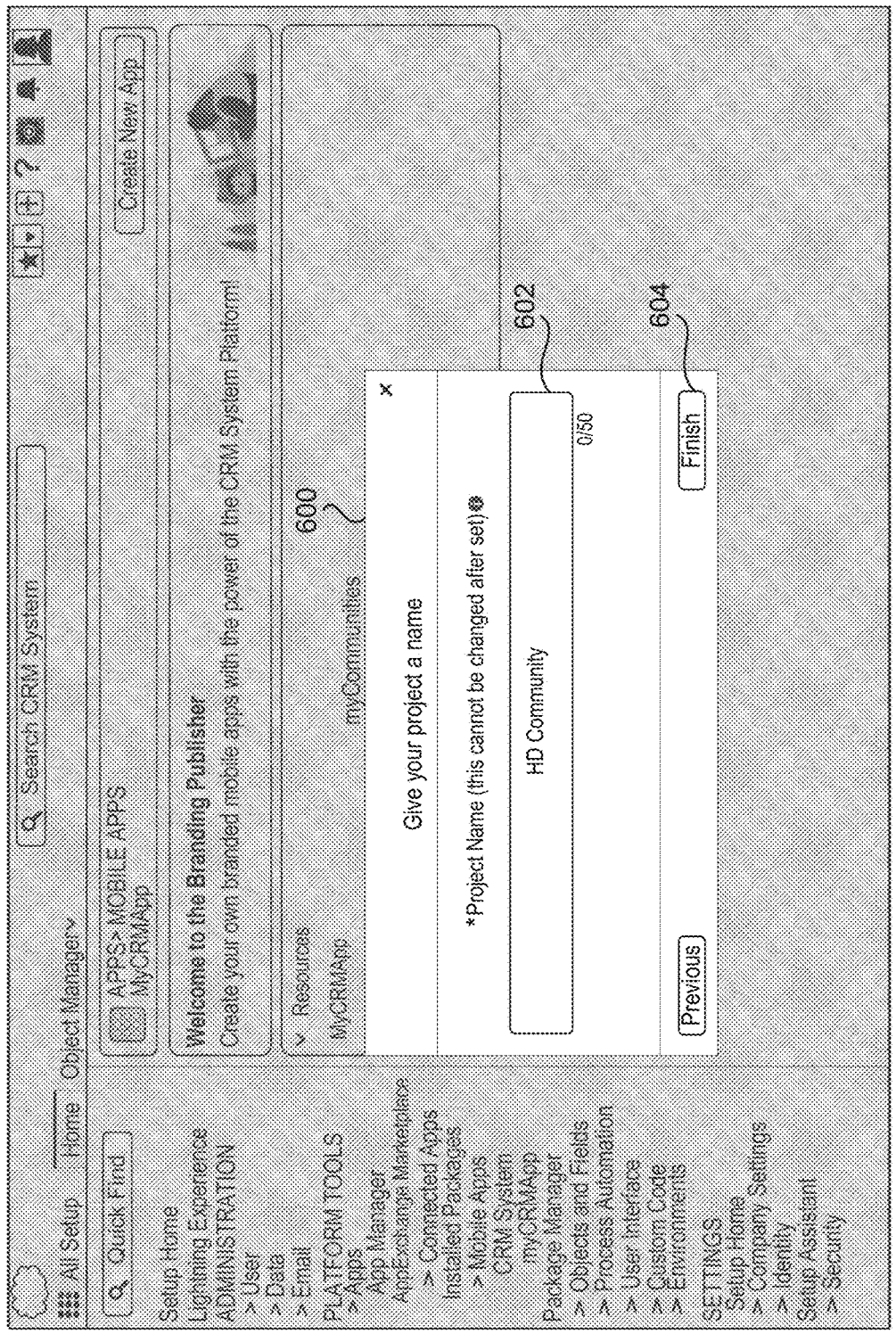
FIG. 6 illustrates a screenshot of a GUI dialog box that allows the administrator to enter a community project name, according to some embodiments.

FIG. 6 illustrates a screenshot of a GUI dialog box 600 that allows the administrator to enter a community project name, according to some embodiments. As shown in FIG. 6, the administrator has entered "HD Community" into a Project Name text box 602. In other embodiments, the administrator can select an existing community from a drop-down selection box. Upon entering or selecting the project name, the administrator can click the "Finish" button 604, which kicks off the Object Manager process to build a custom app.

As previously stated, there are two phases within the custom mobile app submission flow: (1) metadata collection, performed when the administrator fills out distribution model data forms to describe the custom app to build and then starts the build process, and (2) post-submission lifecycle steps that allow the newly created custom app to be packaged, installed, tested in a beta version, and submitted to an app store for review before publishing in the app store. Phase 1 and Phase 2 will be further described in the following paragraphs according to the components and capabilities of the mobile app publisher GUI.

Some descriptions that follow illustrate the mobile app publisher GUI using one of two example environments: (1) an ANDROID operating system (OS) environment for publishing an ANDROID mobile app to a GOOGLE PLAY app store; or (2) an iPhone operating system (iOS) environment for publishing an iPhone mobile app to an APPLE APP STORE. A person skilled in the relevant arts would recognize that the specifics as they pertain to an APPLE or GOOGLE PLAY app store herein are by way of example, and not limitation, and that a similar approach would be used for setting up, building, and publishing an app with other app stores.

Phase 1: Metadata Collection During Setup of a Distribution Model

Figure 7:
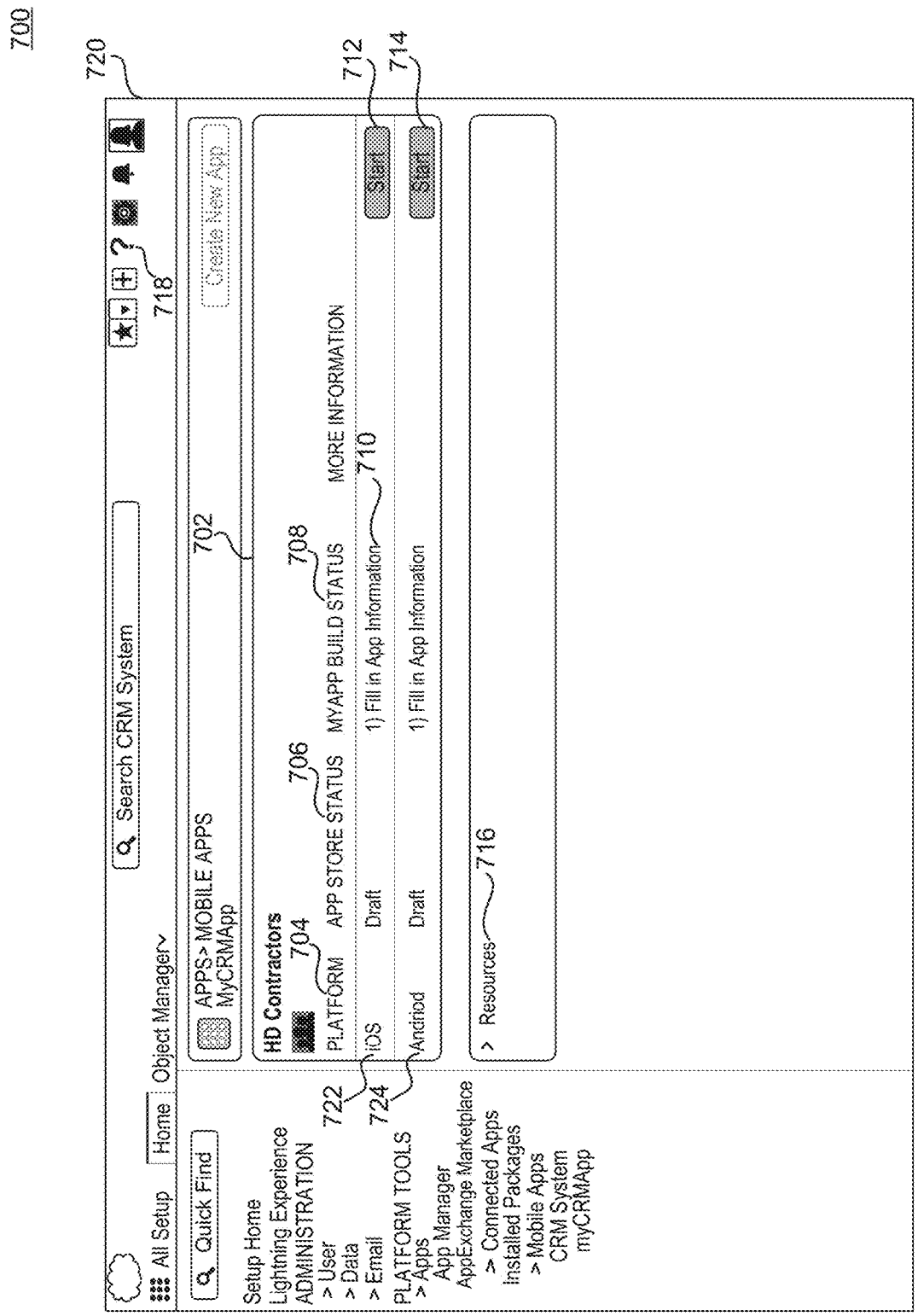
FIG. 7 illustrates a screenshot of an Object Manager GUI for managing the creation of a mobile app, according to some embodiments.

FIG. 7 illustrates a screenshot of an Apps Management GUI 700, including an Object Manager GUI 702 for managing the creation of a mobile app, according to some embodiments. Using the Object Manager GUI 702, the administrator can start the creation of a branded community mobile app on a specific mobile platform 704, having, for example, either an iOS 722 or an Android 724 operating system. The Object Manager GUI 702 can track status of the creation of a community mobile app with "App Store Status" 706 and "MyApp Build Status" 708 for each type of platform build, as applicable.

"App Store Status" 706 can indicate whether the app is in one of various development states, including draft, submitted, ready to build, beta, beta in review, beta cancelled, beta approved, live in review, live, live cancelled, archived, and deleted status, for example. The states apply to either draft data, that is, a draft app version that a CRM system client is in the process of preparing, or live data, that is, a completed and published app that is live on the APPLE or GOOGLE PLAY app stores.

"MyApp Build Status" 708 will provide the administrator's progress within the steps of the lifecycle for building an app. In some embodiments, for example, step (1) in the app build lifecycle can be "Fill in App Information" 710. Various embodiments may comprise different steps. See, for example, FIG. 8, below. The administrator can start an app build by clicking one of the "Start" buttons 712, 714 for the selected platform.

In some embodiments of the Apps Management GUI 700, various information resources can be provided as links (not shown) on a Resources card 716 to demonstrate, in video format, the capabilities of the app builder, to instruct the administrator how to use the GUI functionality, to define terms, and/or to provide the benefits and/or considerations of certain selections, for example. The provision of resources here can be similar to the provision of resources shown in FIG. 4. Provision of resources in multiple places within the GUI structure lends to the ease of use of the mobile app publisher GUI for building custom applications.

In some embodiments, the Resources card can be auto-expanded wherever the Resources card resides, such as on the GUI Landing Page 400 of the custom mobile app publisher GUI, as shown in FIG. 4. In other embodiments, the Resources card can be collapsed as a default mode so as not to distract from the information on the main or active pages of the custom mobile app publisher GUI, as shown in FIG. 7. In alternative embodiments, the functionality of a Resources card 406, 716 can be replaced or supplemented by the functionality of a help icon 408, 718 in a Help Tray 410, 720 of the current GUI screen.

Figure 8:
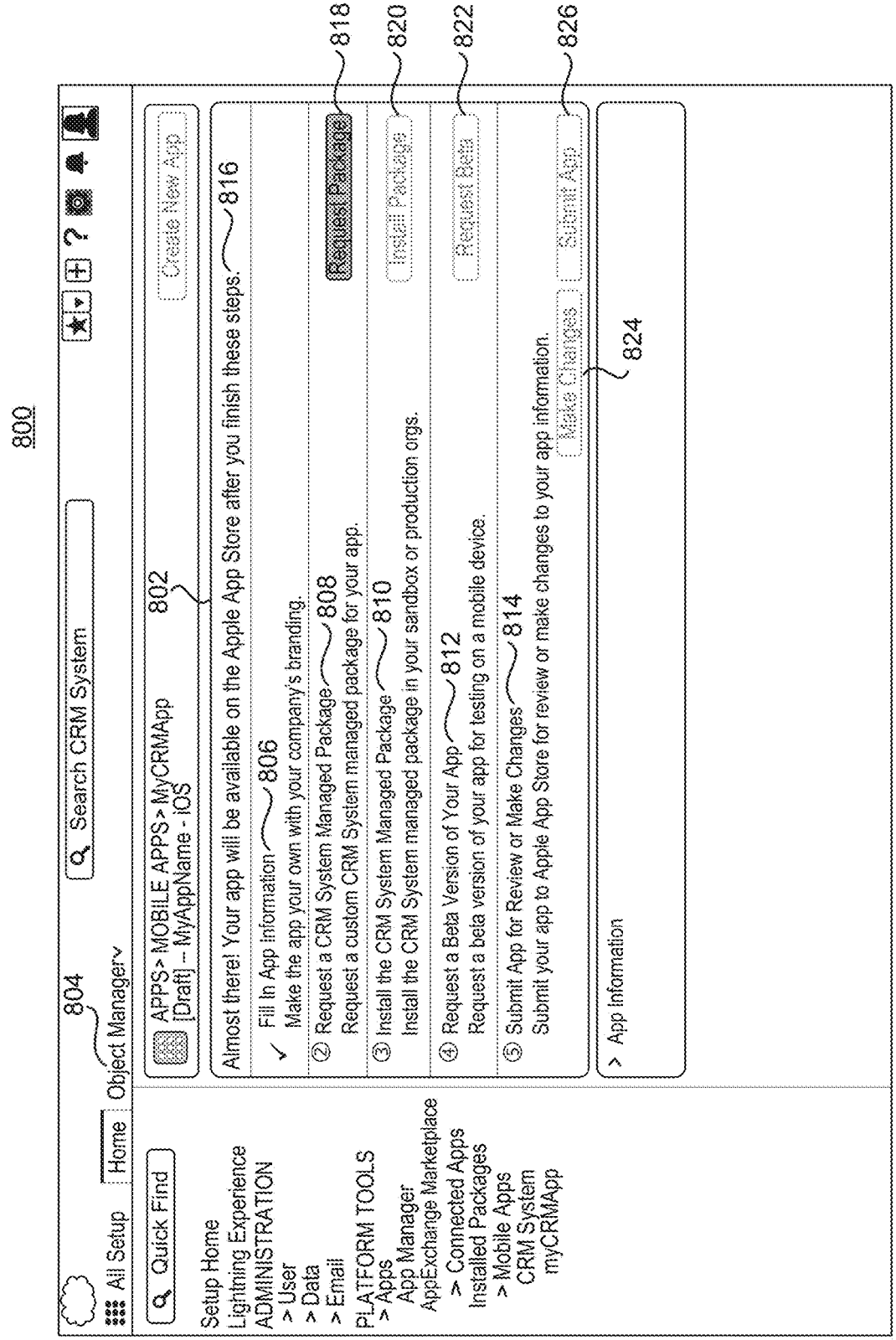
FIG. 8 illustrates a screenshot of an App Build Status GUI within the Object Manager GUI, showing the steps involved in setting up a branded mobile app, according to some embodiments.

FIG. 8 illustrates a screenshot 800 of the App Build Status GUI 802 within the Object Manager GUI 804, showing the steps involved in setting up a branded mobile app, according to some embodiments. Build step (1) is "Fill in App Information" 806; build step (2) is "Request a CRM System Managed Package" 808; build step (3) is "Install the CRM System Managed Package" 810; build step (4) is "Request a Beta Version of Your App" 812; and build step (5) is "Submit App for Review or Make Changes" 814, for example. As the administrator completes each step, the steps are marked complete by a green checkmark in place of the step number, as shown for build step (1) "Fill in App Information" 806. In some embodiments, build step (1) "Fill in App Information" 806 can be automatically marked as complete once an administrator submits metadata to define the app to be created. In these embodiments, an administrator can have the ability to edit the metadata as necessary.

In other embodiments, build step (1) is not necessary to list, and could be eliminated from an app builder, if an administrator is not allowed to edit metadata after it is submitted or at any point during the lifecycle of the app creation, for example. As shown in FIG. 8, once the steps are completed, the created "app will be available in the <OS name> App Store" 816. If build step (1) is not necessary or not used in the app creation process, the lifecycle can start at build step (2), "Request a CRM System Managed Package" 808.

Regardless whether build step (1) is listed within the steps of setting up a branded mobile app, app creation is driven by initial metadata that an administrator enters into the app builder to set up a distribution model for the mobile app. A distribution model defines configuration data for publishing an app, such as what entity has rights to publish the app, what entity has access to manage and maintain the app, where the app is published, and the credentials for accessing the administrator privileges, for example.

In some embodiments, an administrator can have privileges to, for example, select a distribution model for the custom mobile app, view the required configuration instructions for setting up a delegated account in an iOS or Android environment, input additional metadata required for each distribution model, and change the distribution model during an out-of-band update. An out-of-band update represents a change to the distribution model, such as by a CRM system client, when the distribution model is already instituted and in use to govern an existing "live" published app.

Figure 9A:
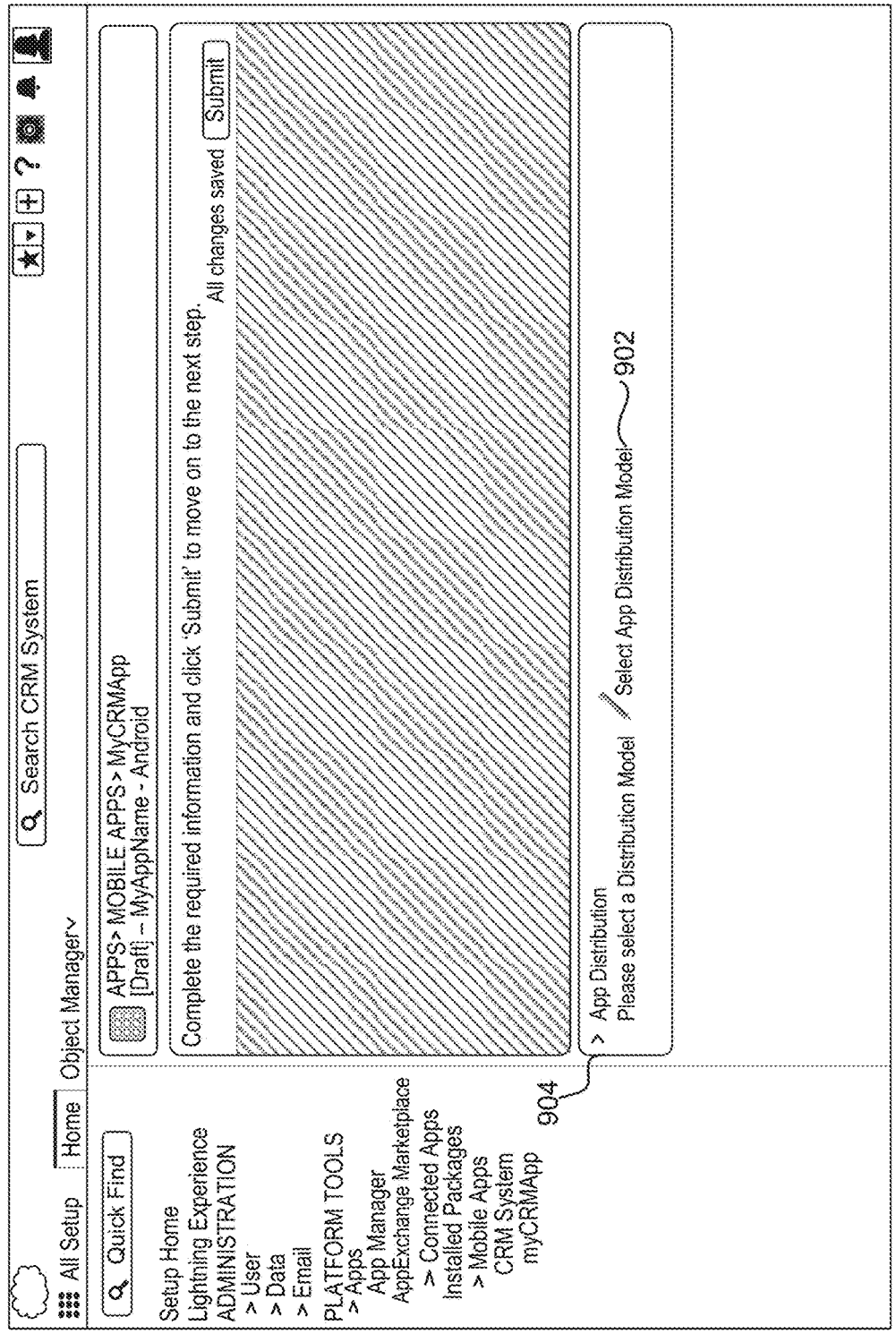
FIGS. 9A and 9B illustrate screenshots of distribution model selection GUIs that display after an administrator starts an app build, according to some embodiments.
Figure 9B:
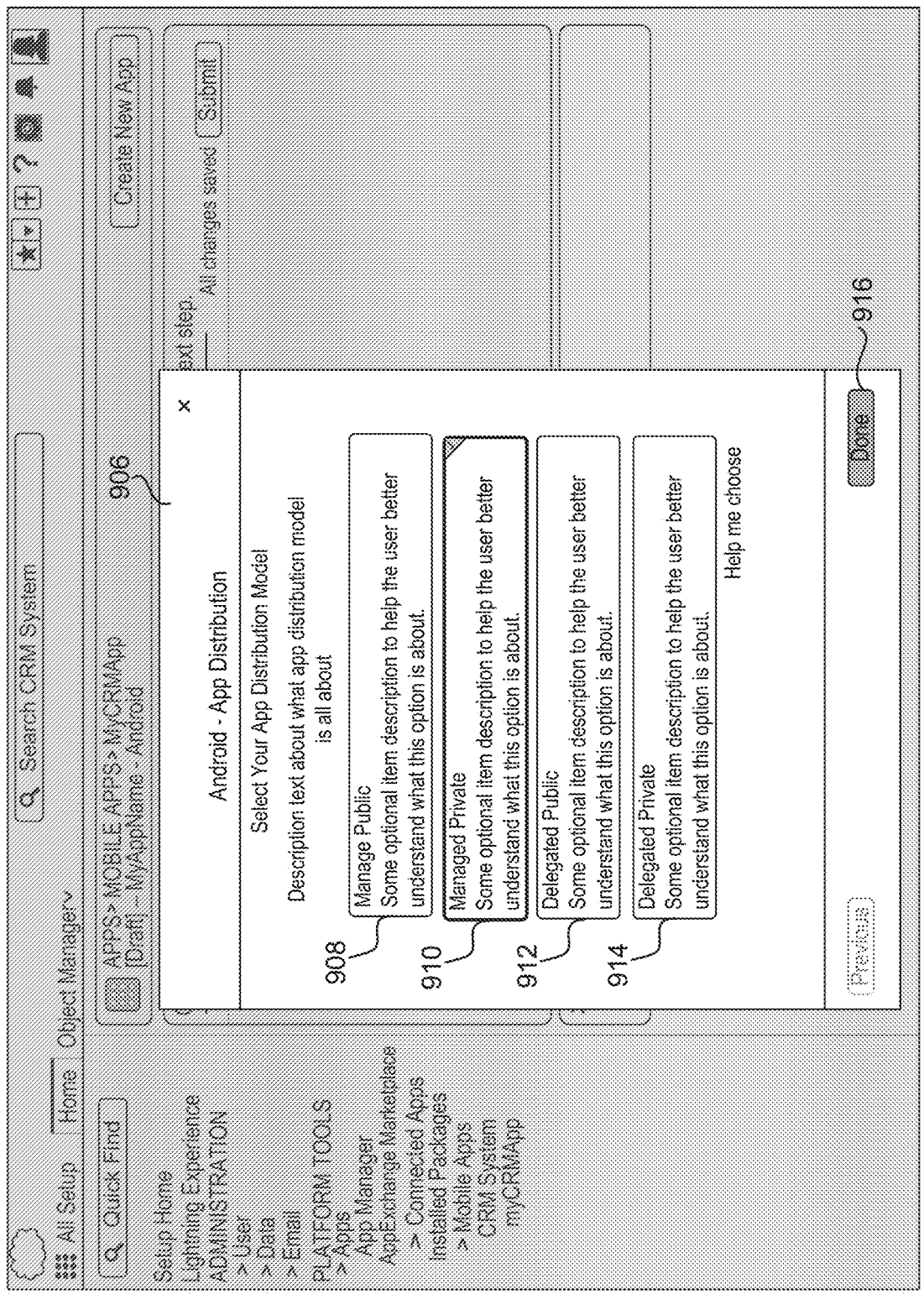

FIG. 9A illustrates a screenshot 900 of distribution model selection GUI components that displays after an administrator starts an app build by clicking one of the "Start" buttons 712, 714 for the selected platform (see FIG. 7), according to some embodiments. When the administrator clicks on "Select App Distribution Model" 902 under the App Distribution 904 GUI component, a distribution model picker 906 pops up, as shown in FIG. 9B. In some embodiments, and as shown in this example, four (4) distribution models are available to be selected for the Android operating system: Managed Public 908, Managed Private 910, Delegated Public 912, and Delegated Private 914. For the iOS, two (2) distribution models are available: Managed Private and Delegated Public.

In a Managed Public 908 distribution model, the app can be published under the CRM provider's developer account, and the CRM system client (the owner of the app) does not need to maintain its own app store developer accounts (for the ANDROID operating system, for example). The app can be available to install on a public app store, such as the GOOGLE PLAY app store, for example.

In a Managed Private 910 distribution model, like Managed Public 908, the app can be published under the CRM provider's developer account, and the CRM system client (the owner of the app) does not need to maintain its own app store developer accounts (for iOS and/or ANDROID, for example). However, the app will not be available on a public app store, such as APPLE APP STORE or GOOGLE PLAY app store, but can be installed on a private app store.

In a Delegated Public 912 distribution model, the app can be published under the CRM system client's developer account, and the CRM provider can be granted minimum access to control one app. The app can be available to install on a public app store, such as APPLE APP STORE and GOOGLE PLAY app store, for example.

In a Delegated Private 914 distribution model, like Delegated Public 912, the app can be published under the CRM system client's developer account, and the CRM provider can be granted minimum access to control one app. However, the app will not be available on a public app store, such as GOOGLE PLAY, but can be installed on a private app store.

Depending on the distribution model selected, various different metadata must be collected from the CRM system client to complete the setup of a custom branded mobile app. Some, but not all, of the configuration data included in the distribution models and configured with the GUI components described herein, will be described. A person of ordinary skill in the art would understand that configuration data collection may be similarly performed for many of the data items, and where different, a person of ordinary skill in the art would understand the differences. A person of ordinary skill in the art would also understand that, depending on the configuration of the desired distribution model, different combinations of configuration data may be collected using core or unique GUI components arranged similarly or differently on a GUI screen. See, for example, FIG. 10, which illustrates a table 1000 comprising examples of the combinations of metadata that the CRM system client can enter in an App Distribution GUI, according to some embodiments. These metadata are used to configure, for example, a custom mobile app distribution model for an Android 1002 mobile device or an iOS 1004 mobile device.

Figure 11:
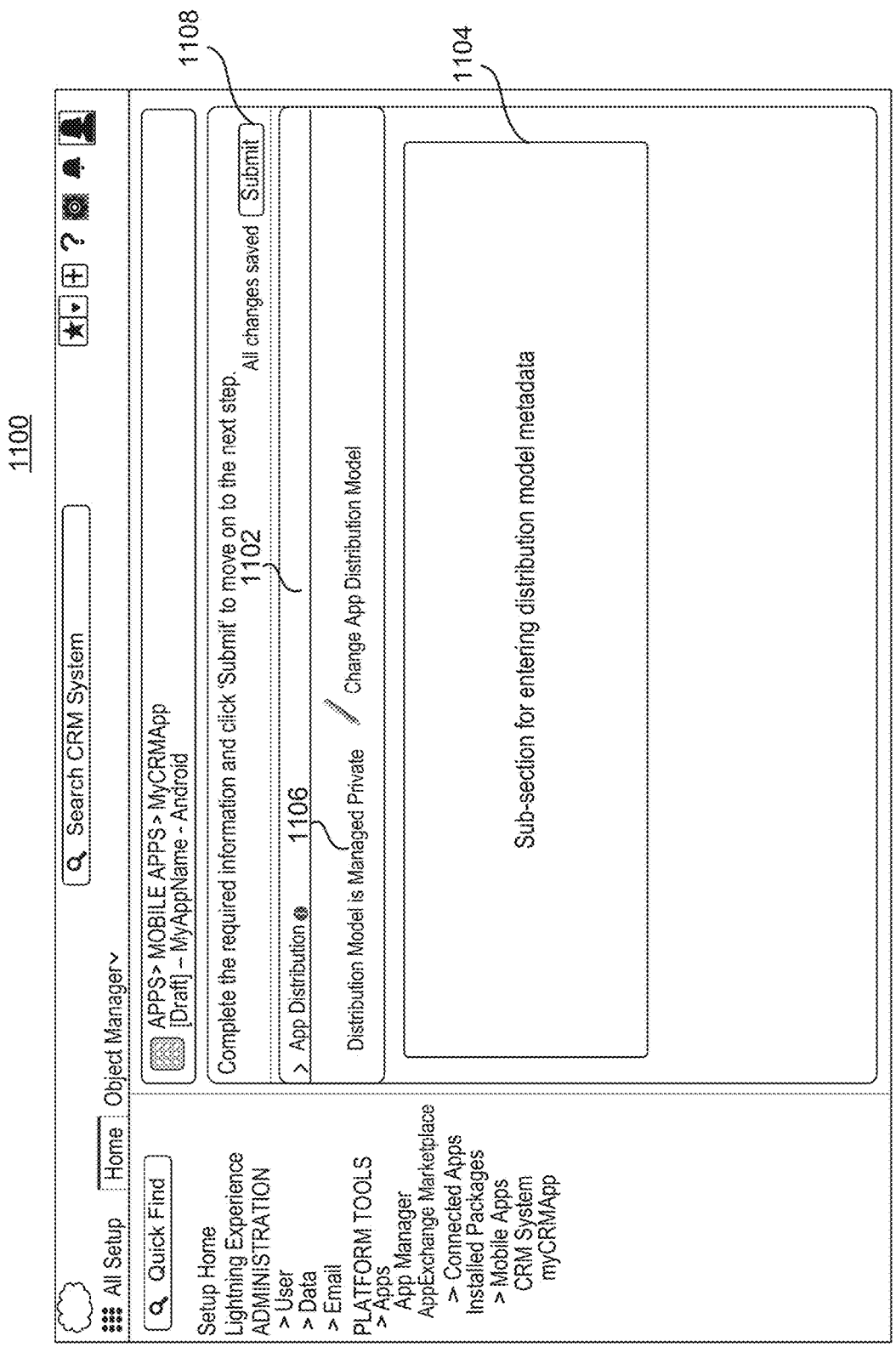
FIG. 11 illustrates an example of a screenshot of the App Distribution GUI for collecting the metadata, according to some embodiments.

FIG. 11 illustrates a screenshot 1100 of the App Distribution GUI 1102, according to some embodiments. FIG. 11 shows an example of a data entry sub-section 1104 for keying in required metadata for the Managed Private 1106 distribution model. This App Distribution GUI 1102 appears, for example, when the distribution model has been selected from the Managed Private 910 GUI button shown in FIG. 9B and the administrator has clicked the "Done" button 916. When the user is done entering distribution model metadata, clicking the "Submit" button 1108 takes the user to the next GUI screen. In various embodiments, the App Distribution GUI 1102 may have different data entry methods for entering distribution model metadata, as would be apparent to a person of ordinary skill in the art.

Figure 12:
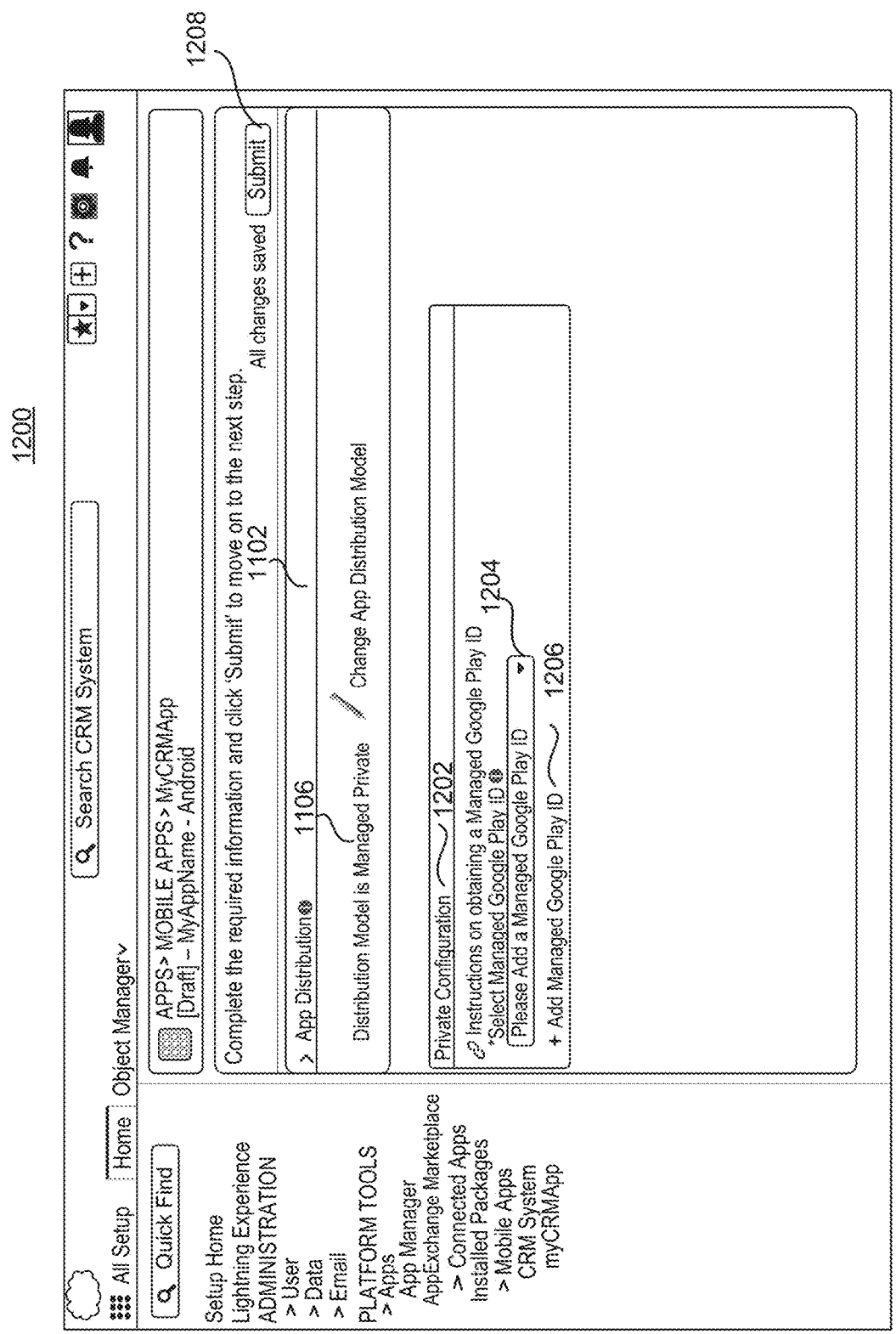
FIG. 12 illustrates a screenshot of the App Distribution GUI, showing a drop-down menu for selecting private configuration data when the distribution model has been selected as Managed Private, according to some embodiments.

FIG. 12 illustrates a screenshot 1200 of the App Distribution GUI 1102, showing a drop-down account picker 1204 for setting up a private configuration in the Private Configuration GUI component 1202, according to some embodiments. The Private Configuration GUI component 1202 can be used to select an existing Managed GOOGLE PLAY ID, for example, or to add a new managed GOOGLE PLAY ID, when the distribution model has been selected as Managed Private 1106. If a managed GOOGLE PLAY ID already exists, it will appear in the drop-down account picker 1204 for potential selection. If no managed GOOGLE PLAY ID already exists, or if a new managed GOOGLE PLAY ID is needed or desired, the administrator can select "Add Managed GOOGLE PLAY ID" 1206 and click the "Submit" button 1208, bringing up the GUI component shown in FIG. 13A.

Figure 13A:
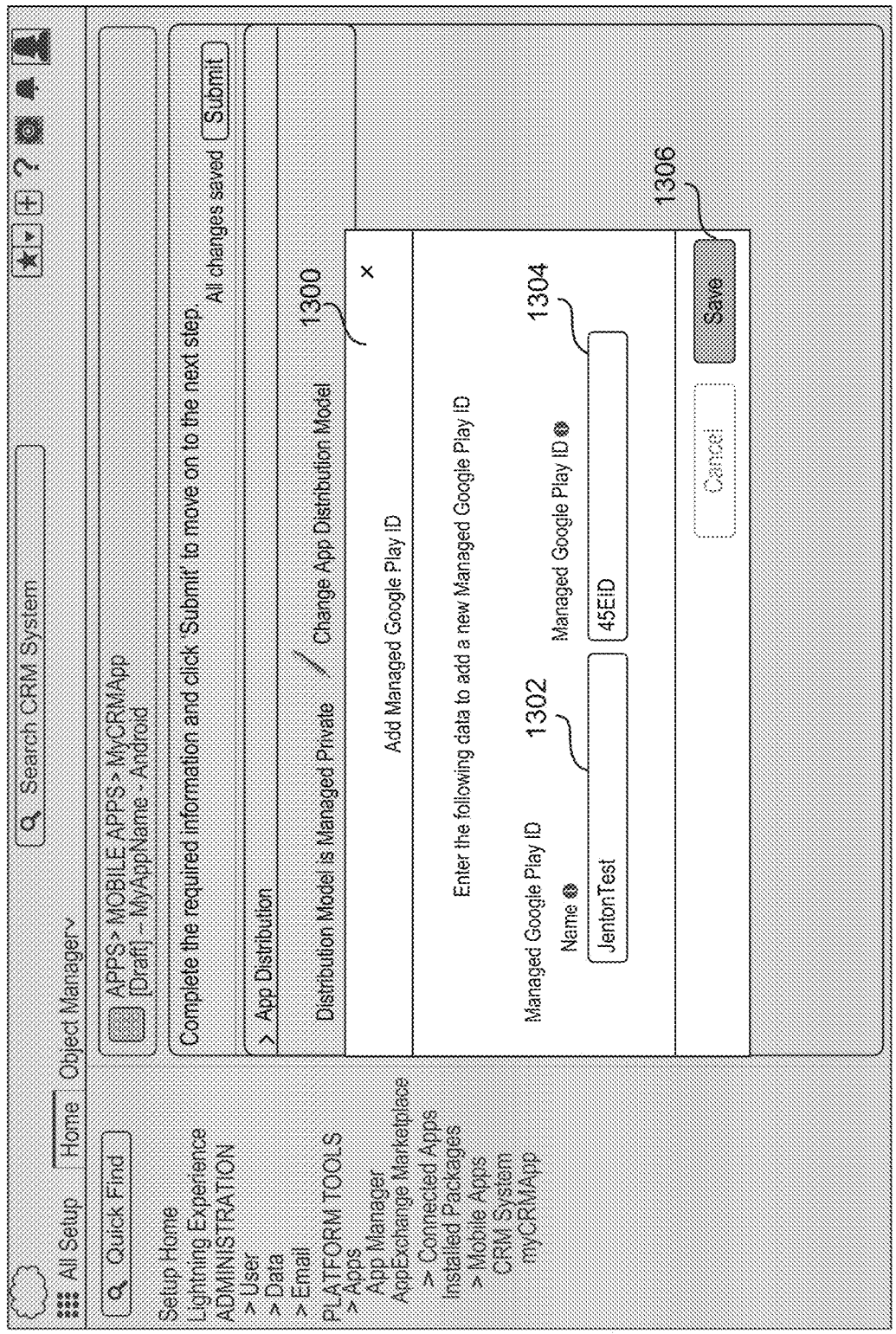
FIG. 13A illustrates a pop-up dialog box for entering a name and ID of a desired new managed app store, according to one example.
Figure 13B:
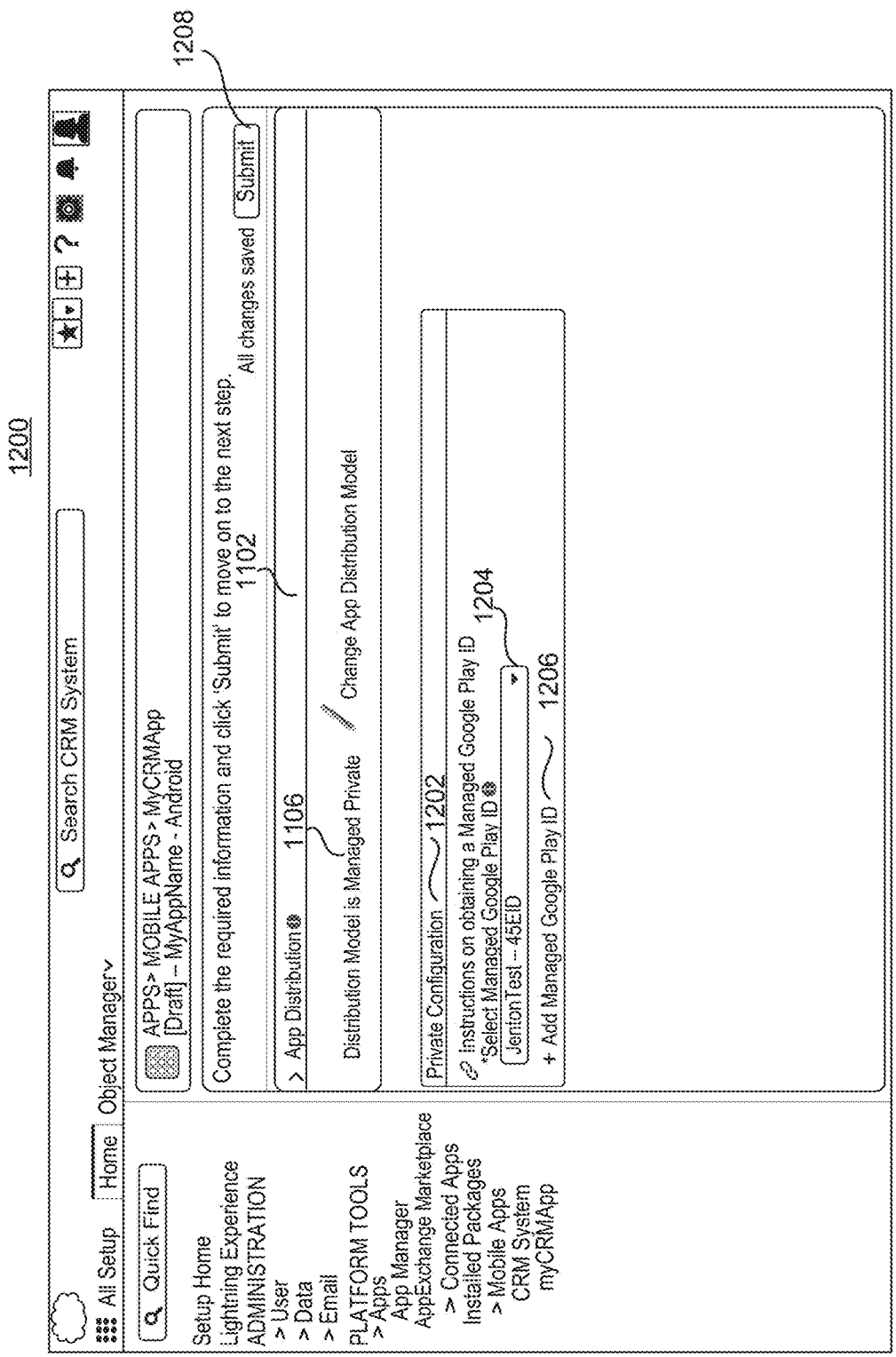
FIG. 13B illustrates the screenshot of FIG. 12 with the name and ID of the newly added managed app store ID, according to one example.

FIG. 13A illustrates a pop-up dialog box 1300 for entering a first set of a name 1302 and an ID 1304 of a desired new managed app store ID, according to some embodiments. FIG. 13A shows one example for a GOOGLE PLAY app store in an ANDROID OS environment. Once the administrator adds this information and clicks the "Save" button 1306, the administrator will be returned to the App Distribution GUI 1102 and the Managed GOOGLE PLAY name and ID previously entered will appear in the account picker 1204, as shown in FIG. 13B. FIG. 13B illustrates the screenshot of FIG. 12 with the name and ID of the newly added managed GOOGLE PLAY ID, according to the example. Here, the example name is "JentonTest" and the example ID is "45EID."

Figure 13C:
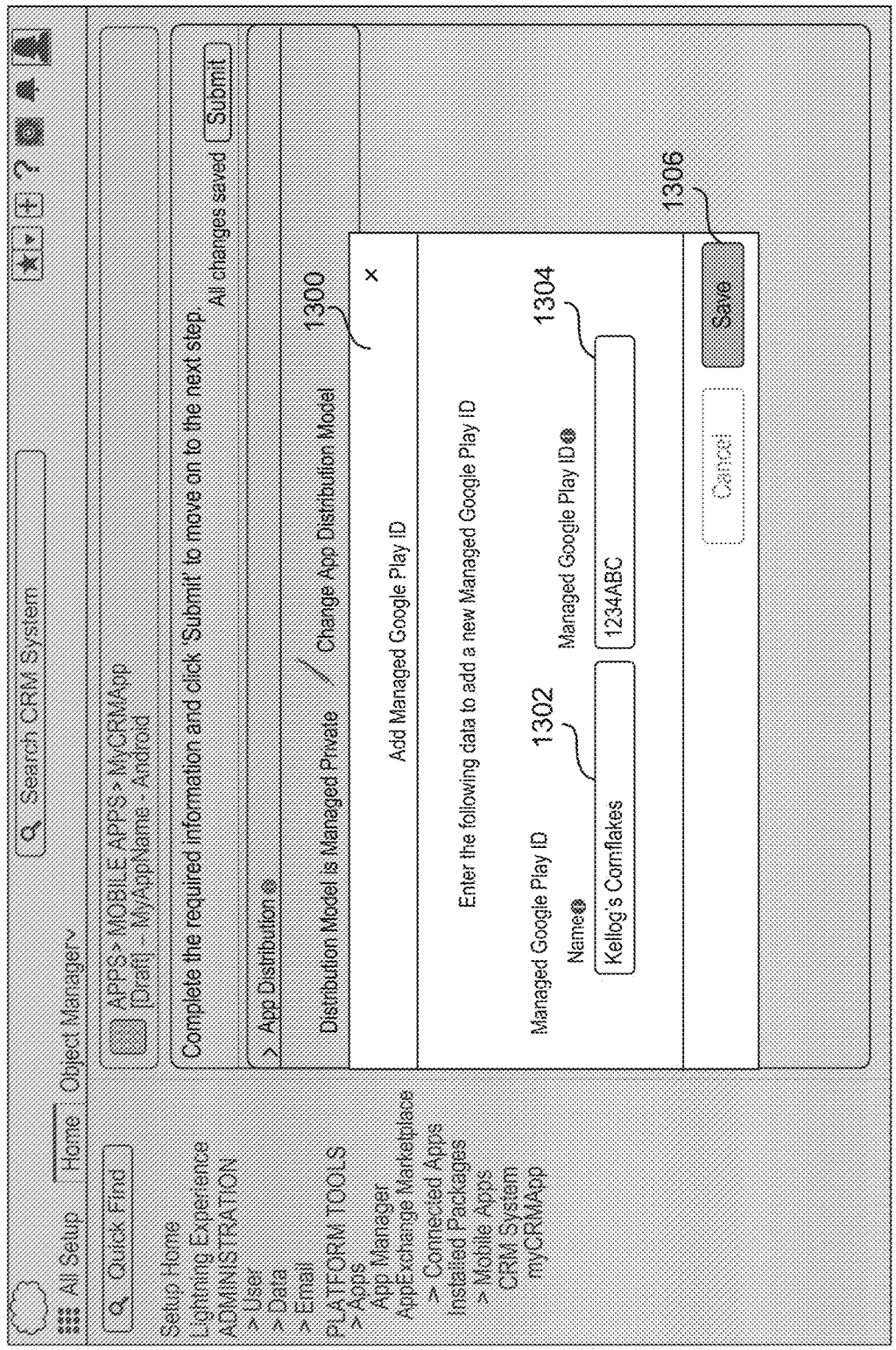
FIG. 13C illustrates the pop-up dialog box of FIG. 13A with a second managed app store ID name and ID set, according to one example.
Figure 13D:
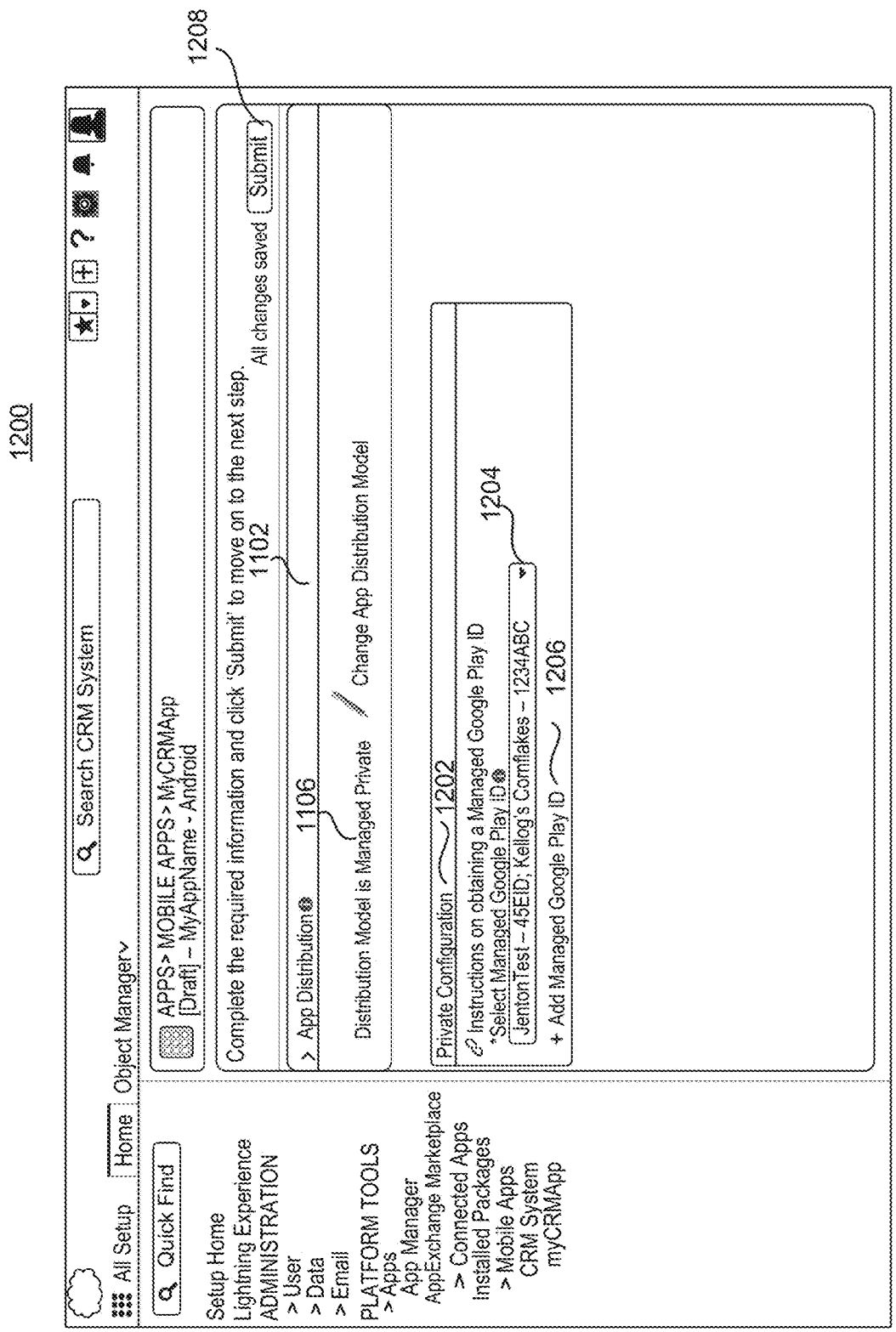
FIG. 13D illustrates the screenshot of FIG. 12 with two name and ID sets of managed GOOGLE PLAY ID information that have been selected concurrently for a Private Configuration, according to one example.

In some embodiments, the account picker 1204 for private distribution models is a combination box with a multi-selection, multi-select picker. When multiple items are in the picker, the list is alphabetized by name, according to some embodiments, or alphabetized by ID, in other embodiments. If there is already a first account selected, and the administrator adds a second account, the new second account becomes selected along with the first account. This is illustrated by FIGS. 13C and 13D. A person of ordinary skill in the art would understand that there are various other types of GUI components that could be used to collect this metadata from an administrator. In some embodiments, a data table GUI component, for example, can be used in place of the multi-select account picker 1204, for example.

FIG. 13C further extends the examples of FIGS. 13A and 13B. In FIG. 13C, a second managed GOOGLE PLAY ID name 1302 and ID 1304 set is entered in the pop-up dialog box 1300 (here, they are "Kellog's Cornflakes" and "1234ABC," respectively, for example). FIG. 13D illustrates the screenshot of FIG. 12 with the first and second name and ID sets of managed GOOGLE PLAY ID information that have been selected concurrently for a Private Configuration, according to the example. In FIG. 13D, both "JentonTest-45EID" and "Kellog's Cornflakes-1234ABC" appear in the multi-select account picker 1204, for example.

Figure 14:
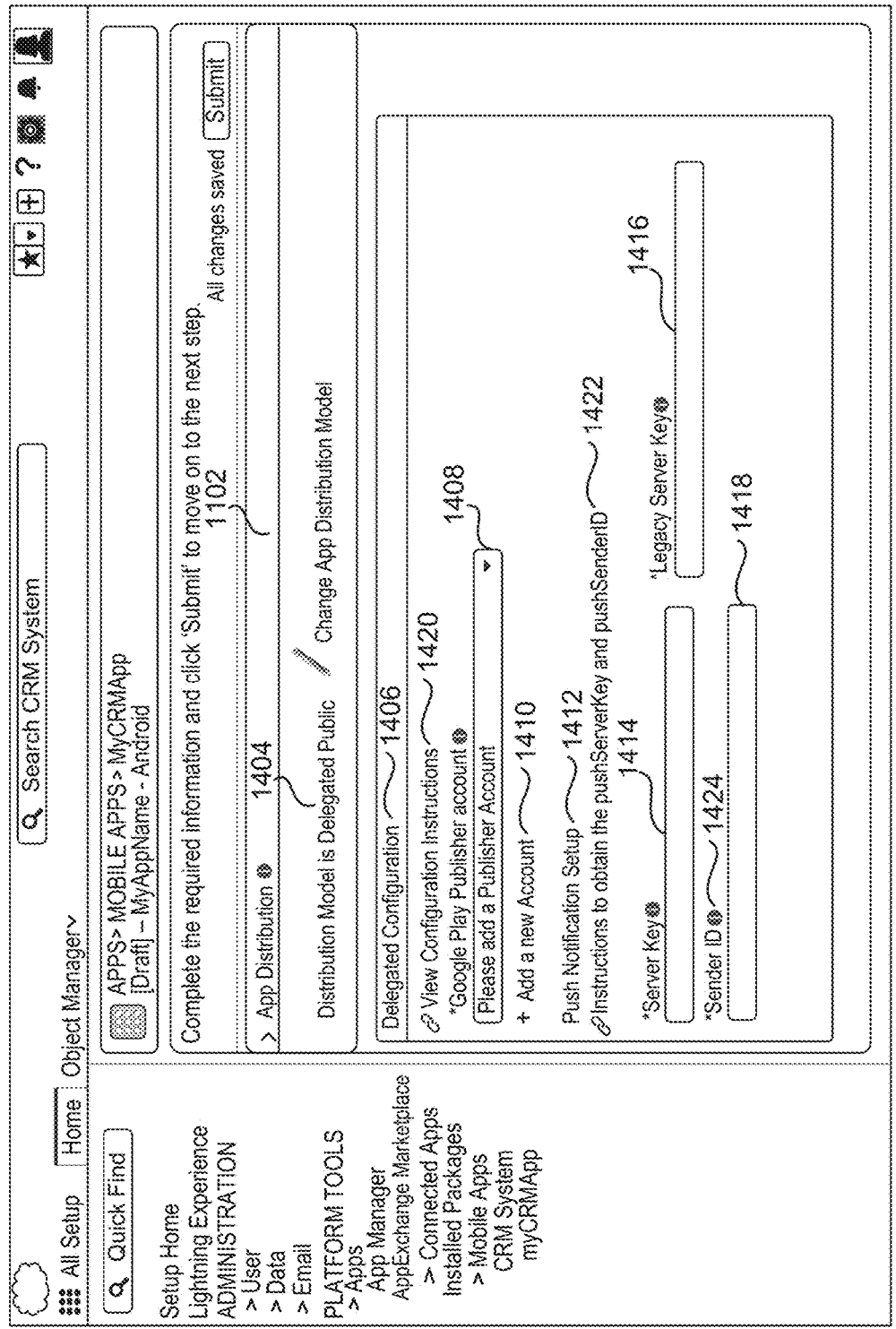
FIG. 14 illustrates a screenshot of the App Distribution GUI, showing data entry and selection GUI components when the distribution model has been selected as Delegated Public, according to some embodiments.

FIG. 14 illustrates a screenshot 1400 of the App Distribution GUI 1102, showing data entry and selection GUI components when the distribution model has been selected as Delegated Public 1404, according to some embodiments. For the Delegated Configuration 1406, the administrator can select or add (if a selection is not already available in the account picker 1408 drop-down menu) a publisher account for the applicable app store, which for FIG. 14 is GOOGLE PLAY for ANDROID, for example. Similarly to the GUI actions shown in FIGS. 12 and 13, if publisher account information does not already exist, or if the administrator desires to add new publisher account information, by selecting "Add a new Account" 1410, a dialog box 1500 (shown in FIG. 15A) will pop up to allow the administrator to enter a new publisher account ID. In contrast to the embodiment for a Private Configuration as shown in and described for FIGS. 13A-13D, the Delegated Configuration 1406 has an account picker that allows for a single select picklist for a GOOGLE PLAY publisher account. A publisher account is required in a delegated distribution model because, as previously described, apps can be published under the CRM system client's developer account.

FIG. 14 also illustrates GUI components for entry of information for push notification setup 1412. A push notification, which is a message that pops up on a mobile device from an app to alert an app user, can be sent by the app at any time, and app users do not have to have the app in use to receive the notifications. Push notifications are not available from web apps, which makes a published mobile app desirable for this functionality. Push notifications can provide an app user a status of a sale event or a reminder to take an action, for example. By speaking directly to a user when an alert is most timely, push notifications can allow a CRM system client to be better connected to a customer, vendor, or partner. In the Delegated Public 1404 configuration, for example, an administrator can set up a custom branded mobile app with a Server Key 1414, a Legacy Server Key 1416, and a Sender ID 1418, to allow for push notifications to come from the app server through the app to the app user.

In the App Distribution GUI 1102, a link to configuration instructions 1420 for configuring the Delegated Public app, and a link to push notification setup instructions 1422, are available to provide administrator help resources during the process of app creation. Various other embodiments can incorporate help links and instructional messages from within the GUI pages during the distribution model setup steps and other steps, as would be apparent to a person of ordinary skill in the art. For example, to assist the administrator further, parameters for entry into a GUI component can be defined at an informational link, accessed by an informational icon 1424.

Figure 15A:
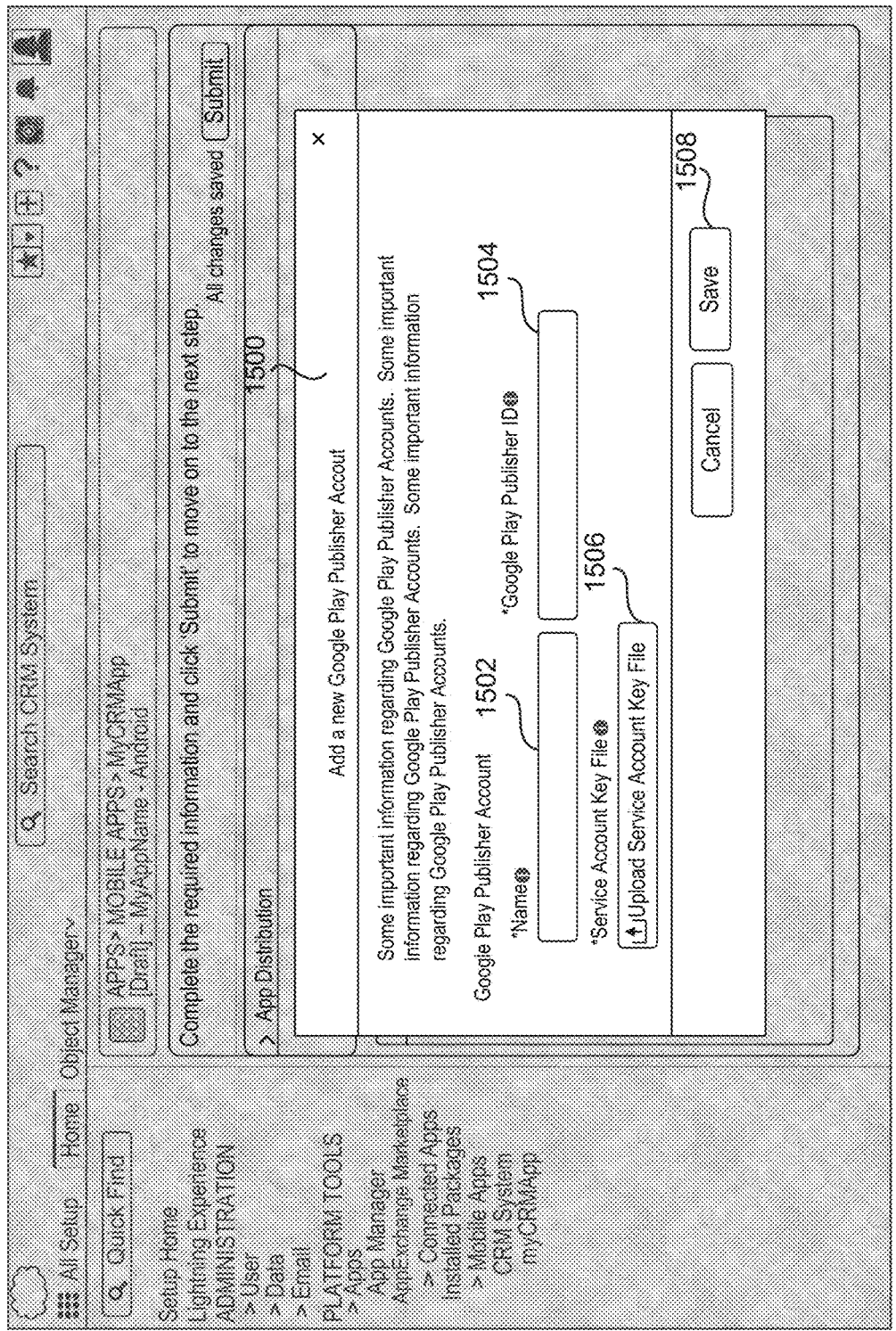
FIG. 15A illustrates a pop-up dialog box for entering a name and an app store Publisher ID of a new app store publisher account, and for uploading a service account key file, according to some embodiments.

FIG. 15A illustrates a GUI component for entering identifying information for a new app store publisher account, according to some embodiments. FIG. 15A includes a pop-up dialog box 1500 for entering a name 1502 and a GOOGLE PLAY Publisher ID 1504 of the desired new GOOGLE PLAY publisher account, for a Delegated Public 1404 distribution model, according to some embodiments. Additionally, the administrator must upload a service account key file 1506, which, in some embodiments, must be a valid JavaScript Object Notation (JSON) file (with file extension .JSON) with a key named "type" that is set to "service_account," for example. Other embodiments may use a different data interchange file format, according to one of various applicable standards as known to a person of skill in the relevant arts, for transmitting the data objects associated with the publisher account. The "Save" button 1508 can remain inactive (unaffected by a user click) until all object fields are completed and validations are successful. All object fields having been validated by the CRM system, the "Save" button can become active, indicated by a bolded, colored button.

Figure 15B:
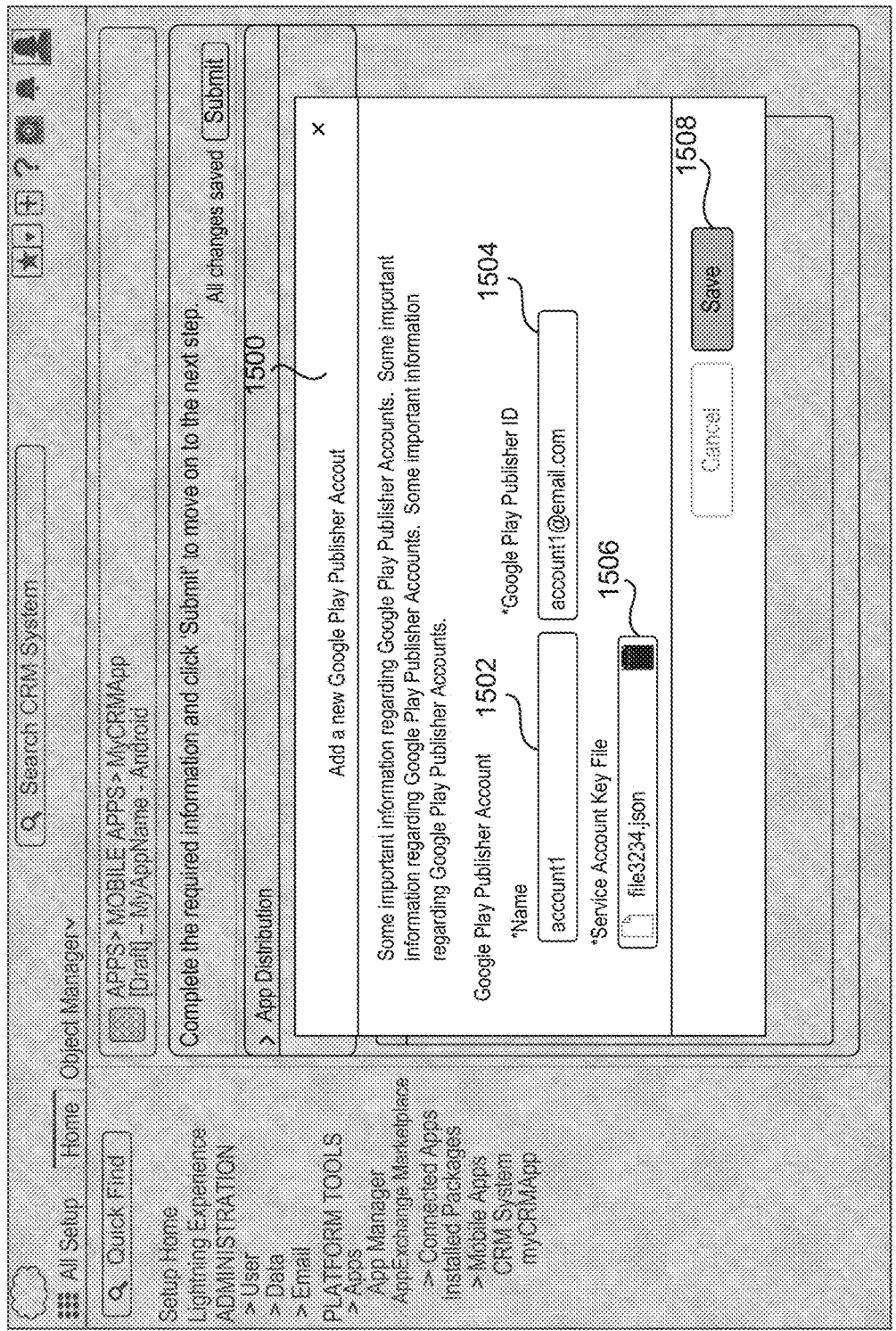
FIG. 15B illustrates the successfully filled pop-up dialog box of FIG. 15A, according to some embodiments.

FIG. 15B illustrates the successfully filled pop-up dialog box of FIG. 15A, according to some embodiments. For example, FIG. 15B includes a filled pop-up dialog box 1500, with "account1" entered as the name 1502 of the GOOGLE PLAY Publisher Account, and "account1@email.com" entered as the GOOGLE PLAY Publisher ID 1504. JSON file "file 3234.json" has been uploaded as the Service Account Key File 1506. The "Save" button 1508 is thus active.

Figure 16:
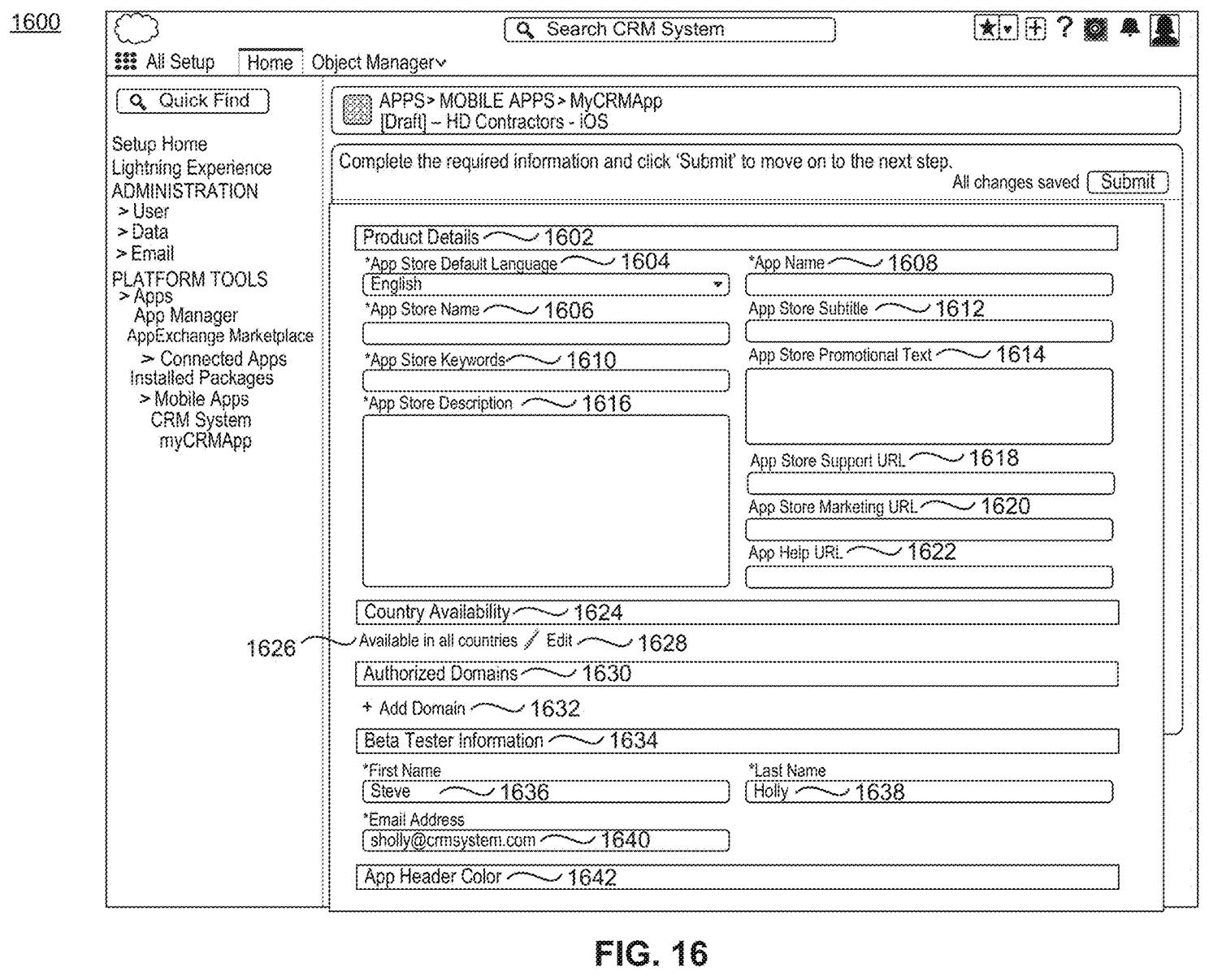

FIG. 16 illustrates the App Store Configuration GUI 1600 for specifying the custom mobile app packaging and configuration details, according to some embodiments. The packaging and configuration details include an app store on which to publish the custom mobile app, other product details, and the publishing constraints of the mobile app, for example, according to some embodiments. Under product details 1602, an administrator can enter the app store default language 1604 in which the app is published, shown in FIG. 16, for example, as English. The administrator can specify the app store name 1606 of the app store to which to publish, for example, the APPLE APP STORE for iOS mobile devices or GOOGLE PLAY for ANDROID mobile devices.

The administrator can also specify identifying information for the mobile app that will be listed or displayed in the app store to help users find it, such as app name 1608, app store keywords 1610, an app store subtitle 1612, app store promotional text 1614, and an app store description 1616 to describe the purpose and functionality of the mobile app to potential users, for example. The administrator can set up help links for users by entering an app store support URL 1618, an app store marketing URL 1620, and an app help URL 1622, for example.

In some embodiments, the administrator can also limit the countries and domains in which the mobile app can be downloaded. For example, in setting country availability 1624, the administrator can make an app available in all countries 1626 (as a default) or available in certain specified countries by editing a country list using the "Edit" button 1628. The administrator can also specify the authorized domains 1630 in which the mobile app can be accessed by adding a specific domain to the authorized list (using the "Add Domain" button 1632).

The administrator can also specify beta tester information 1634 with the first name 1636, last name 1638, and email address 1640 of the person responsible for the beta testing of the app, for example. Visual settings, such as the app header color 1642 and other color and formatting schemes, for example, can also be specified.

If an administrator desires to change any of the app store packaging or configuration settings after a beta version of the mobile app is tested or after the mobile app is published, the administrator can click the "Make Changes" button 824 in the App Build Status GUI 802 at build step (5). In some embodiments, once the mobile app is published, the administrator would have to start over with a blank app store configuration GUI form. In other embodiments, the administrator can call up the app store settings for the selected mobile app and make changes directly to the existing settings within the populated App Store Configuration GUI 1600 form.

Phase 1 Changes: Out-of-Band Updates to a Mobile App's Distribution Model

On-demand customer branding changes can be made via out-of-band modifications to an app by the CRM system client administrator, in addition to app changes made via regular app updates by the CRM system provider. An administrator may also change a distribution model of a published app. However, changing distribution models in an out-of-band update may require a significant amount of work for an administrator. This is because, for example, if an administrator moves a mobile app from public to private distribution, the administrator may have to migrate the app's users from the existing app to a new one. The administrator may also need to provide more metadata based on the distribution model change. Various example scenarios are supported by the CRM system. FIG. 17 illustrates a table 1700 showing the different administrative requirements for changing distribution models in an out-of-band update of a custom mobile app in an Android environment, for example. FIG. 18 illustrates a table 1800 showing the different administrative requirements for changing distribution models in an out-of-band update of a custom mobile app in an iOS environment, for example.

For out-of-band changes to a distribution model of a custom branded mobile app (with or without communities), in some embodiments, metadata can be lost when a new app is created for the change. In such cases, a GUI component can offer warnings regarding administrator impact and request confirmations from the administrator before making a distribution model change that can cause metadata from the current mobile app to be lost. This may require an administrator to reenter metadata from the beginning of an app configuration process.

Other embodiments can preserve a clone of the app and its metadata so that an administrator does not have to start over from the beginning of the app configuration process. Some embodiments can copy all the metadata from the old app configuration into the new app configuration, saving the administrator time and preventing potential error in preserving desired aspects of the old configuration. A person of ordinary skill in the art would understand that metadata can be saved for a new app creation in addition to an app modification, in various situations and embodiments. Regardless of the complexity of the administrator's intended change(s), the method, system, and apparatus can enable on-demand modifications to the distribution model parameters or the packaging parameters for automatic creation of an updated or new custom mobile app.

Phase 2: Post-Submission Lifecycle for Packaging, Installation, Beta Testing, and App Store Submission, Review & Publishing The post-metadata submission lifecycle for a custom mobile app under the disclosed UI framework includes specifying packaging details and app installation details, provision and management of a beta version of the mobile app for testing, and submission of the accepted mobile app to a private or public app store for review and publishing. Further details of the UI framework are disclosed in concurrently-field U.S. Provisional Patent Application No. 62/735,496, entitled "Desktop and Mobile Graphical User Interface Unification," and U.S. patent application Ser. No. 15/726,332, entitled "Systems, Methods, and Apparatuses for Creating and Reusing Communities Within a Cloud Based Computing Environment," which disclose, for example, the "Lightning Component" UI framework.

The lifecycle from the standpoint of administrator action is driven through the mobile app publisher GUI as illustrated by the examples of FIG. 8, showing the steps involved in setting up and building a branded mobile app, according to some embodiments. The Phase 2 steps according to FIG. 8 are: build step (2)—"Request a CRM System Managed Package" 808; build step (3)—"Install the CRM System Managed Package" 810; build step (4)—"Request a Beta Version of Your App" 812; and build step (5)—"Submit App for Review or Make Changes" 814, for example. The administrator must complete the steps in order by clicking on the appropriate activation button, as shown: "Request Package" 818, "Install Package" 820, "Request Beta" 822, and "Make Changes" 824 or "Submit App" 826. The activation buttons 818, 820, 822, 824, and 826 for the respective step will be grayed out and not active until the previous step is complete.

FIGS. 19A-19E illustrate the pop-up informational boxes that the CRM system can send through the mobile app publisher GUI to lead the administrator through the final build steps of the live mobile app, according to some embodiments. As the administrator completes each step, the CRM system, through the mobile app publisher GUI, can throw a respective pop-up box to indicate the status of the activation of the related step. As the CRM system completes each requested step, the CRM system can send an email to the administrator to indicate that the deliverable for that step is ready. The following paragraphs illustrate examples of this GUI and system behavior, for each build step in the mobile app build process of FIG. 8.

In build step (2) of FIG. 8, "Request a CRM System Managed Package" 808, an administrator's packaging specifications, regarding how the custom mobile app will be visually packaged, are implemented into a custom mobile app build. The build can implement a previously-specified custom name for the mobile app, such as a community identification, a logo previously uploaded for the mobile app design, an icon previously uploaded for the mobile app that can appear on the main mobile device screen or in an icon tray on the mobile device, and a previously-chosen color scheme for the mobile app, for example, as may have been entered in the App Store Configuration GUI 1600. Once the administrator is satisfied with the mobile app configuration, the administrator can click the "Request Package" button 818. The CRM system, through the mobile app publisher GUI, can then throw a pop-up box 1910 to indicate that the system is generating a managed package, as shown by the example in FIG. 19A. When the CRM system managed package is ready, the CRM system can send the administrator an email indicating that the managed package is ready. The email can further direct the administrator to build step (3) of FIG. 8 to install the managed package and can also direct the administrator to help resources.

In build step (3) of FIG. 8, "Install the CRM System Managed Package" 810, the administrator can kick off the installation of the custom mobile app once the managed package is ready. The administrator can then click the now-active "Install Package" button 820. The CRM system, through the mobile app publisher GUI, can then throw a pop-up box 1920 to provide instructions to the administrator to install the managed package, as shown by the example in FIG. 19B.

In build step (4) of FIG. 8, "Request a Beta Version of Your App" 812, the administrator can request a beta version of the new mobile app for testing before the mobile app is published in final form in an app store. Once the installation of the managed package is complete, the administrator can then click the now-active "Request Beta" button 822. The CRM system, through the mobile app publisher GUI, can then throw a pop-up box 1930 to indicate that CRM system is generating the beta version of the mobile app, as shown by the example in FIG. 19C. When the beta version of the mobile app is ready, the CRM system can send the administrator (and an identified beta tester, if desired) an email indicating that the mobile app is in beta version status and ready to test.

In build step (5) of FIG. 8, "Submit App for Review or Make Changes" 814, an administrator can submit a mobile app to an app store for review and subsequent publishing, according to some embodiments. The CRM system, through the mobile app publisher GUI, can throw a pop-up box 1940 to indicate that it is time for the administrator to submit the mobile app for review, as shown by the example in FIG. 19D. At this stage, the administrator must confirm that the managed package has been installed in each licensed organization for which the mobile app is needed. This can be accomplished, for example, using a formal checkbox 1946 that must be checked before a "Submit App" button 1950 can become active.

Figure 19A:
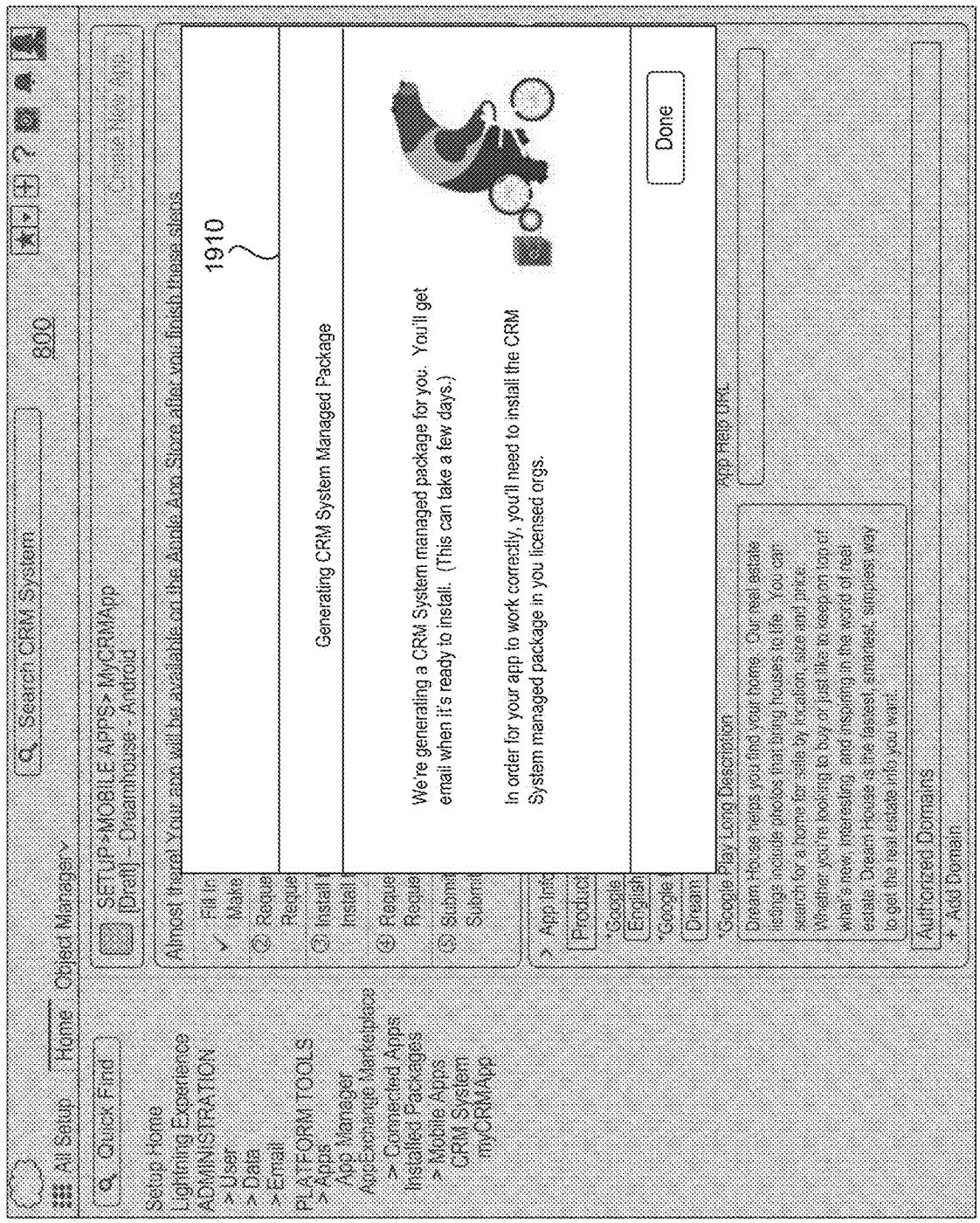
FIGS. 19A-19E illustrate the pop-up informational boxes that the CRM system sends through the mobile app publisher GUI to lead the administrator through the final build steps of the live mobile app, according to some embodiments.
Figure 19B:
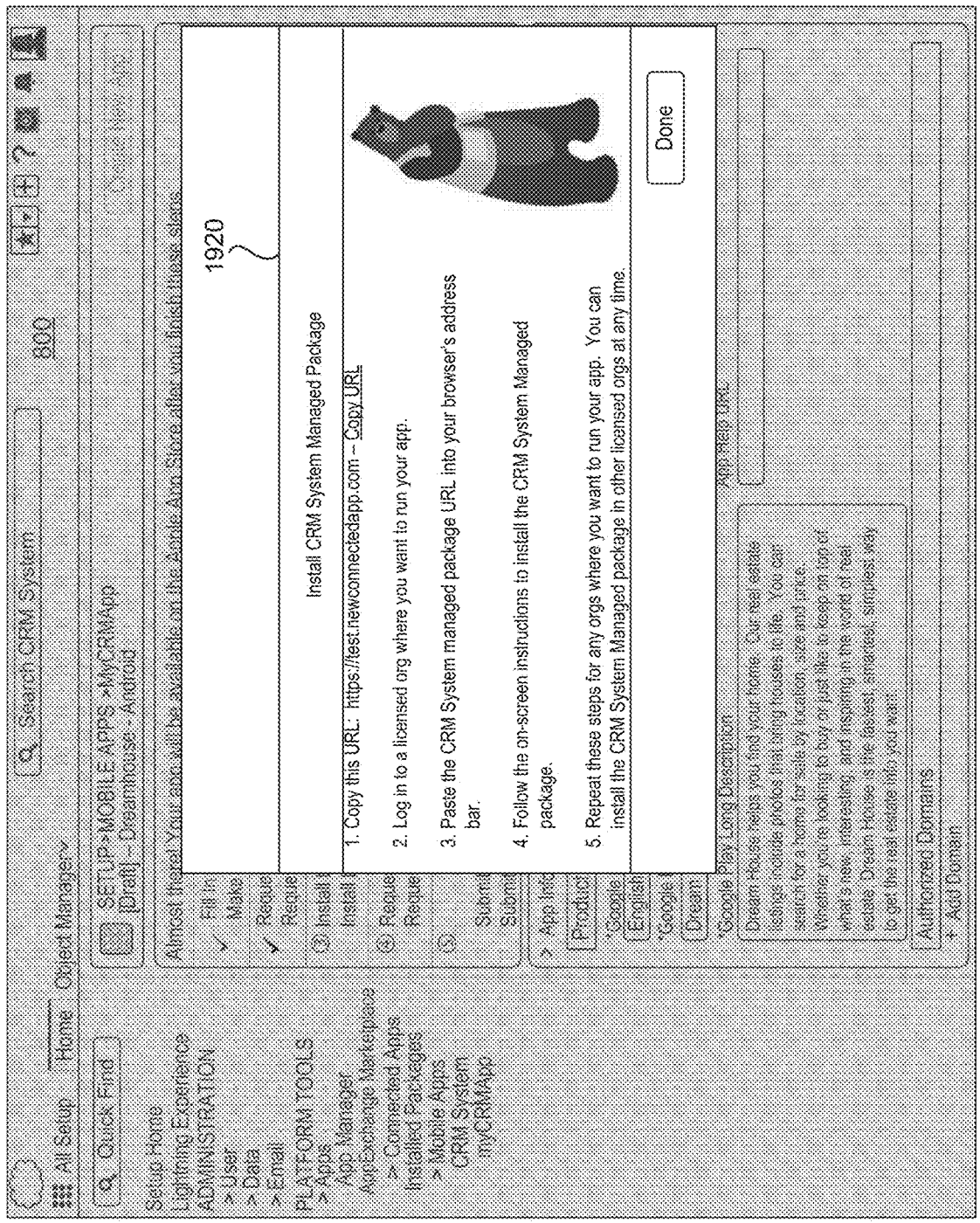
Figure 19C:
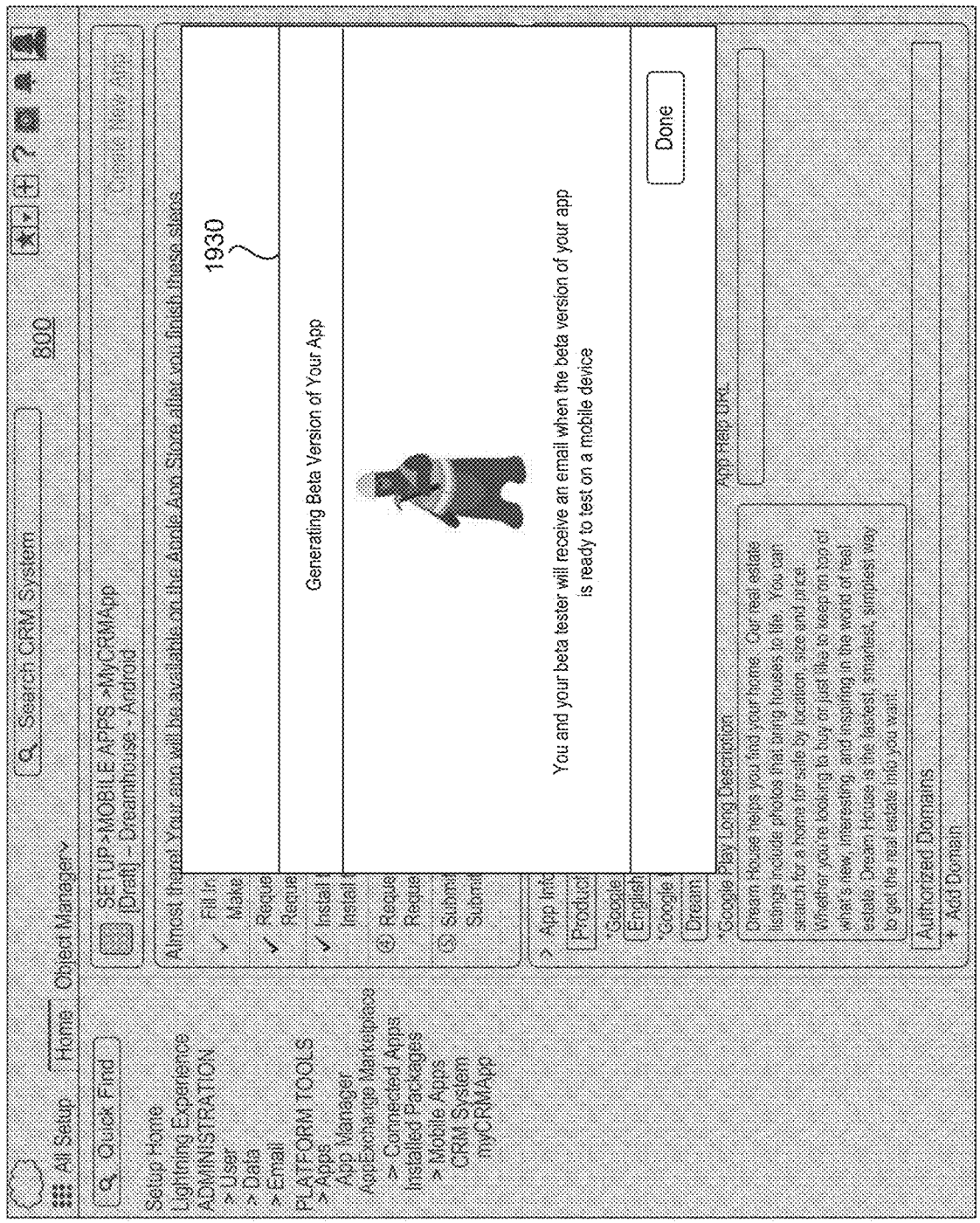
Figure 19D:
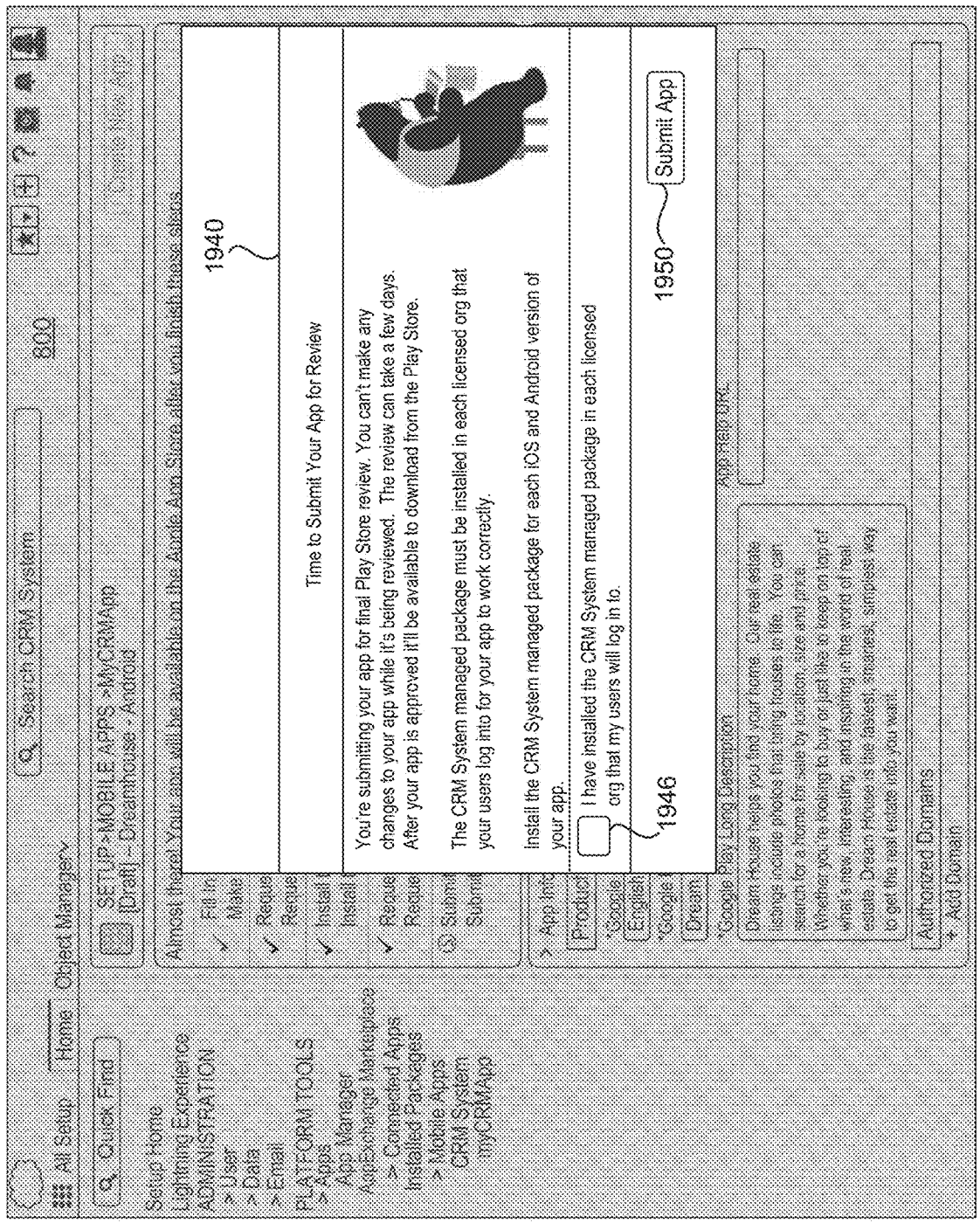
Figure 19E:
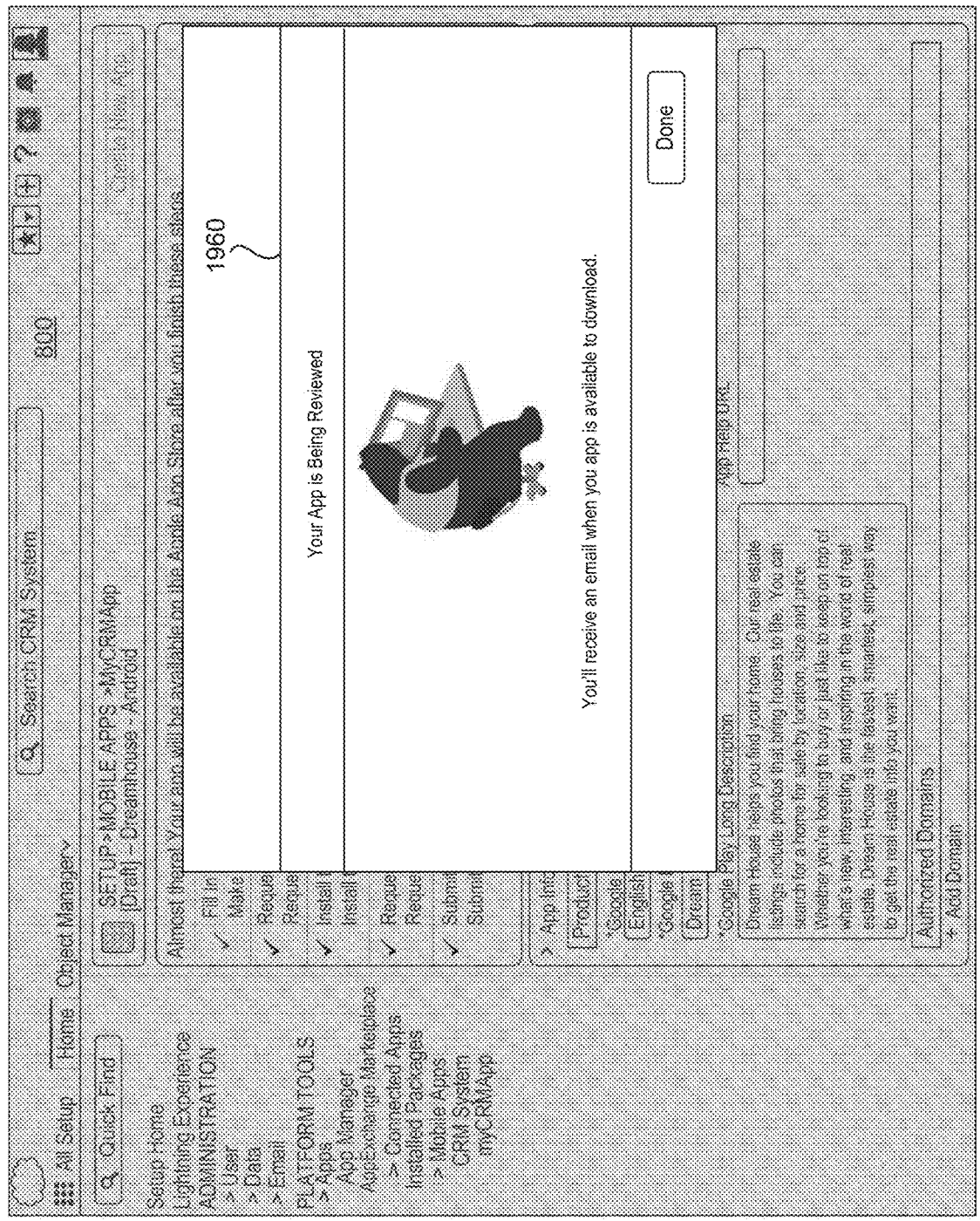

Once managed package installation is confirmed, the administrator can click the "Submit App" button 1950 from the pop-up box 1940 in FIG. 19D, or later click the "Submit App" button 826 from the App Build Status GUI 802 in FIG. 8. Once either "Submit App" button 826 or button 1950 is clicked, the CRM system, through the mobile app publisher GUI, can then throw a pop-up box 1960 to indicate that the mobile app is being reviewed, as shown by the example in FIG. 19E. Once the mobile app is reviewed and ready to download, the CRM system can send the administrator an email indicating that the mobile app is live and available to download and install from the applicable app store. If choosing to make changes, the administrator can return back to the App Store Configuration GUI 1600 by first clicking the "Make Changes" button 824 from the App Build Status GUI 802.

Computer System Implementation

Figure 20:
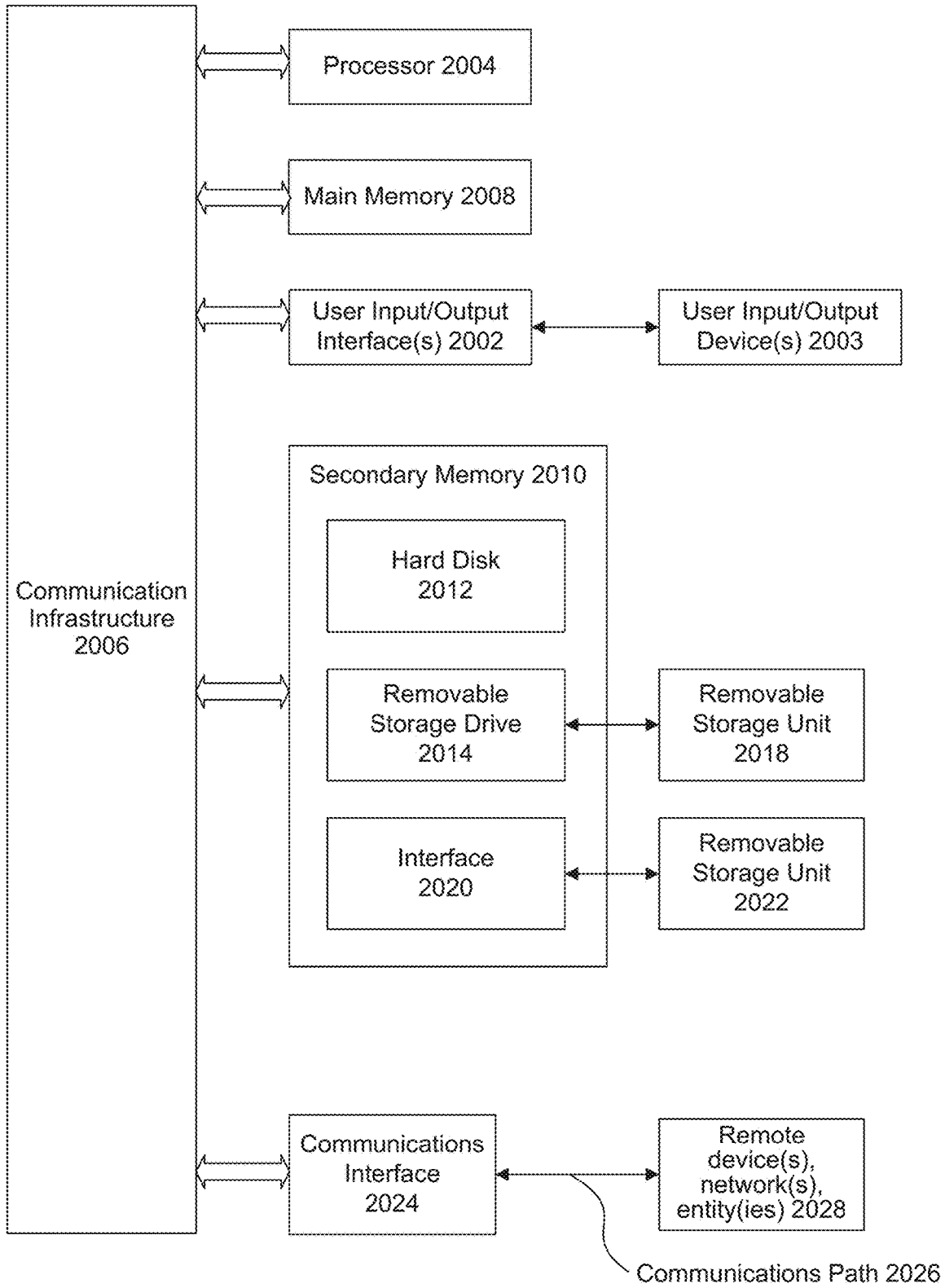
FIG. 20 illustrates an example computer system useful for implementing various embodiments.

Various embodiments may be implemented using one or more well-known computer systems, such as computer system 2000 shown in FIG. 20. One or more computer systems 2000 may be used, for example, to implement any of the embodiments discussed herein, as well as combinations and sub-combinations thereof.

Computer system 2000 may include one or more processors (also called central processing units, or CPUs), such as a processor 2004. Processor 2004 may be connected to a communication infrastructure or bus 2006.

Computer system 2000 may also include user input/output device(s) 2003, such as monitors, keyboards, pointing devices, etc., which may communicate with communication infrastructure 2006 through user input/output interface(s) 2002.

One or more of processors 2004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2000 may also include a main (or primary) memory 2008, such as random access memory (RAM). Main memory 2008 may include one or more levels of cache. Main memory 2008 may have stored therein control logic (i.e., computer software) and/or data.

Computer system 2000 may also include one or more secondary storage devices or memory 2010. Secondary memory 2010 may include, for example, a hard disk drive 2012 or a removable storage device or drive 2014. Removable storage drive 2014 may be a floppy disk drive, a magnetic tape drive, a compact disk drive, an optical storage device, tape backup device, or any other storage device/drive.

Removable storage drive 2014 may interact with a removable storage unit 2018. Removable storage unit 2018 may include a computer usable or readable storage device having stored thereon computer software (control logic) or data. Removable storage unit 2018 may be a floppy disk, magnetic tape, compact disk, DVD, optical storage disk, or any other computer data storage device. Removable storage drive 2014 may read from or write to removable storage unit 2018.

Secondary memory 2010 may include other means, devices, components, instrumentalities, or other approaches for allowing computer programs or other instructions or data to be accessed by computer system 2000. Such means, devices, components, instrumentalities, or other approaches may include, for example, a removable storage unit 2022 and an interface 2020. Examples of the removable storage unit 2022 and the interface 2020 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 2000 may further include a communications or network interface 2024. Communications interface 2024 may enable computer system 2000 to communicate and interact with any combination of external devices, external networks, external entities, etc. (individually and collectively referenced by reference number 2028). For example, communications interface 2024 may allow computer system 2000 to communicate with external or remote devices 2028 over communications path 2026, which may be wired or wireless (or a combination thereof), and which may include any combination of LANs, WANs, the Internet, etc. Control logic or data may be transmitted to and from computer system 2000 via communications path 2026.

Computer system 2000 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 2000 may be a client or server, accessing or hosting any applications or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 2000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 2000, main memory 2008, secondary memory 2010, and removable storage units 2018 and 2022, as well as tangible articles of manufacture embodying any combination of the foregoing. Such control logic, when executed by one or more data processing devices (such as computer system 2000), may cause such data processing devices to operate as described herein.

Based on the teachings contained in this disclosure, it will be apparent to persons skilled in the relevant art(s) how to make and use embodiments of this disclosure using data processing devices, computer systems, or computer architectures other than that shown in FIG. 20. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   providing, by a publishing software, a graphical user interface (GUI) that enables selection of a template for creating a custom mobile device application (app) for a customer relationship management (CRM) client, wherein the template provides a pre-configured format to pre-configure the custom mobile device app;
   receiving, by the publishing software, from entry via the GUI, metadata comprising an identification of a specific user community to be served by the custom mobile device app;
   detecting, by the publishing software, a selection of a selected distribution model from a list of distribution models for an electronic application storefront (app store) via the GUI for the custom mobile device app and the specific user community, wherein the list of distribution models defines public accessibility to the custom mobile device app in the app store and management of the custom mobile device app by the CRM client in the app store;
   displaying, by the publishing software and in response to detecting the selection of the selected distribution model, a first set of input fields or a second set of input fields respectively based on a determination that a first distribution model or a second distribution model has been selected for the app store, wherein the second set of input fields and the first set of input fields are not identical and wherein the second distribution model is different from the first distribution model;
   collecting, by the publishing software, configuration information via the first set of input fields or the second set of input fields based on the selected distribution model;
   creating, by the publishing software, the custom mobile device app based on at least the metadata and the configuration information; and
   publishing, by the publishing software, the custom mobile device app to the app store based on at least the selected distribution model, wherein the custom mobile device app is accessible from the app store for installation on a mobile device according to the selected distribution model.

2. The method of claim 1, wherein the creating the custom mobile device app is performed as a result of GUI operations and the entry of the metadata and the configuration information and wherein the custom mobile device app and the specific user community are both created by the CRM client.

3. The method of claim 1, wherein the selected distribution model is delegated public and enables management of the custom mobile device app by the CRM client and installation of the custom mobile device app on a public app store.

4. The method of claim 1, wherein the selected distribution model is delegated private and enables management of the custom mobile device app by the CRM client and installation of the custom mobile device app on a private app store.

5. The method of claim 1, wherein the selected distribution model is managed public and enables management of the custom mobile device app by a CRM system provider and installation of the custom mobile device app on a public app store.

6. The method of claim 1, wherein the selected distribution model is managed private and enables management of the custom mobile device app by a CRM provider and installation of the custom mobile device app on a private app store.

7. The method of claim 1, wherein parameters of the selected distribution model comprise an app store ID, an app store account name, push notification server parameters, and a service account token.

8. The method of claim 1, wherein the configuration information comprises a custom app name, a custom logo, a unique app icon, and selectable colors.

9. The method of claim 1, further comprising:
enabling, by the publishing software, on-demand modifications to parameters of the selected distribution model or the configuration information, for creation of an updated or new custom mobile device app.

10. A system, comprising:
a memory; and
at least one processor coupled to the memory, wherein the at least one processor is configured to:
provide, by a publishing software, a graphical user interface (GUI) that enables selection of a template for creating a custom mobile device application (app) for a customer relationship management (CRM) client, wherein the template provides a pre-configured format to pre-configure the custom mobile device app;
receive, by the publishing software, from entry via the GUI, metadata comprising an identification of a specific user community to be served by the custom mobile device app;
detect, by the publishing software, a selection of a selected distribution model from a list of distribution models for an electronic application storefront (app store) via the GUI for the custom mobile device app and the specific user community, wherein the list of distribution models defines public accessibility to the custom mobile device app in the app store and management of the custom mobile device app by the CRM client in the app store;
display, by the publishing software and in response to detecting the selection of the selected distribution model, a first set of input fields or a second set of input fields respectively based on a determination that a first distribution model or a second distribution model has been selected for the app store, wherein the second set of input fields and the first set of input fields are not identical and wherein the second distribution model is different from the first distribution model;
collect, by the publishing software, configuration information via the first set of input fields or the second set of input fields based on the selected distribution model;
create, by the publishing software, the custom mobile device app based on at least the metadata and the configuration information; and
publish, by the publishing software, the custom mobile device app to the app store based on at least the selected distribution model, wherein the custom mobile device app is accessible from the app store for installation on a mobile device according to the selected distribution model.

11. The system of claim 10, wherein the at least one processor is further configured to:
create the custom mobile device app as a result of GUI operations and the entry of the metadata and the configuration information; and
create the customer mobile device app and the specific user community via the publishing software by the CRM client.

12. The system of claim 10, wherein the at least one processor is further configured to:
enable, using a delegated public distribution model, management of the custom mobile device app by the CRM client and installation of the custom mobile device app on a public app store.

13. The system of claim 10, wherein the at least one processor is further configured to:
enable, using a delegated private distribution model, management of the custom mobile device app by the CRM client and installation of the custom mobile device app on a private app store.

14. The system of claim 10, wherein the at least one processor is further configured to:
enable, using a managed public distribution model, management of the custom mobile device app by a CRM provider and installation of the custom mobile device app on a public app store.

15. The system of claim 10, wherein the at least one processor is further configured to:
enable, using a managed private distribution model, management of the custom mobile device app by a CRM system provider and installation of the custom mobile device app on a private app store.

16. The system of claim 10, wherein parameters of the selected distribution model comprise an app store ID, an app store account name, push notification server parameters, and a service account token.

17. The system of claim 10, wherein the configuration information comprises a custom app name, a custom logo, a unique app icon, and selectable colors.

18. The system of claim 10, wherein the at least one processor is further configured to:
enable, by the publishing software, on-demand modifications to parameters of the selected distribution model or the configuration information, for creation of an updated or new custom mobile device app.

19. A non-transitory tangible computer-readable device having instructions stored thereon that, when executed by a computing device, cause the computing device to perform operations comprising:
providing, by a publishing software, a graphical user interface (GUI) that enables selection of a template for creating a custom mobile device application (app) for a customer relationship management (CRM) client, wherein the template provides a pre-configured format to pre-configure the custom mobile device app;
receiving, by the publishing software, from entry via the GUI, metadata comprising an identification of a specific user community to be served by the custom mobile device app;
detecting, by the publishing software, a selection of a selected distribution model from a list of distribution models for an electronic application storefront (app store) via the GUI for the custom mobile device app and the specific user community, wherein the list of distribution models defines public accessibility to the custom mobile device app in the app store and management of the custom mobile device app by the CRM client in the app store;

displaying, by the publishing software in response to detecting the selection of the selected distribution model, a first set of input fields or a second set of input fields respectively based on a determination that a first distribution model or a second distribution model has been selected for the app store, wherein the second set of input fields and the first set of input fields are not identical and wherein the second distribution model is different from the first distribution model;

collecting, by the publishing software, configuration information via the first set of input fields or the second set of input fields based on the selected distribution model;

creating, by the publishing software, the custom mobile device app based on at least the metadata and the configuration information; and publishing, by the publishing software, the custom mobile device app to the app store based on at least the selected distribution model, wherein the custom mobile device app is accessible from the app store for installation on a mobile device according to the selected distribution model.

20. The non-transitory tangible computer-readable device of claim 19, the operations performed by the computing device further comprising:

creating the custom mobile device app as a result of GUI operations and the entry of the metadata and the configuration information; and creating the customer mobile device app and the specific user community via the publishing software by the CRM client.

21. The non-transitory tangible computer-readable device of claim 19, the operations performed by the computing device further comprising:

enabling, by the publishing software, on-demand modifications to parameters of the selected distribution model or the configuration information, for creation of an updated or new custom mobile device app.

* * * * *